US012671989B2

(12) United States Patent
Balmakhtar et al.

(10) Patent No.: US 12,671,989 B2
(45) Date of Patent: Jun. 30, 2026

(54) LEDGER-BASED TELECOMMUNICATIONS NETWORK EVENT ARCHIVING FOR TRUSTED MODEL NON-3GPP DEVICES AND SYSTEMS

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US); Galip Murat Karabulut, Vienna, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 380 days.

(21) Appl. No.: 18/470,291

(22) Filed: Sep. 19, 2023

(65) Prior Publication Data

US 2025/0097700 A1     Mar. 20, 2025

(51) Int. Cl.
*H04W 12/06*      (2021.01)
*H04W 12/033*     (2021.01)
*H04W 12/0433*    (2021.01)

(52) U.S. Cl.
CPC ......... *H04W 12/06* (2013.01); *H04W 12/033* (2021.01); *H04W 12/0433* (2021.01)

(58) Field of Classification Search
CPC ..... H04W 12/06; H04W 92/18; H04W 12/08; H04W 72/25; H04W 72/04; H04W 24/10;
(Continued)

(56) References Cited

U.S. PATENT DOCUMENTS

| | | | |
|---|---|---|---|
| 10,693,954 B2 | 6/2020 | Kozloski et al. | |
| 11,323,530 B2 * | 5/2022 | Krishnaswamy | ..... H04L 67/289 |

(Continued)

FOREIGN PATENT DOCUMENTS

| | | |
|---|---|---|
| CN | 109828958 A | 5/2019 |
| CN | 114185994 A | 3/2022 |

OTHER PUBLICATIONS

Lemes, M. T., et al., "A Tutorial on Trusted and Untrusted Non-3GPP Accesses in 5G Systems—First Steps Toward a Unified Communications Infrastructure", IEEE Access, vol. 10, pp. 116662-116685 (Nov. 4, 2022).

(Continued)

*Primary Examiner* — Kwasi Karikari
(74) *Attorney, Agent, or Firm* — Shook, Hardy & Bacon L.L.P.

(57) ABSTRACT

In various embodiments, ledger-based telecommunications network event archiving for trusted model non-3GPP devices and systems are provided. Trusted model non-3GPP devices can access network functions and services to utilize a ledger-based event recordation service. Through the recordation service, network events associated with trusted model non-3GPP UE device usage of network functions and services may be recorded to an event ledger. The event ledger may comprise a hyperledger and/or blockchain technology, and/or may comprise an element of a distributed ledger network (DLN) and/or distributed ledger technology (DLT)-based records repository. In some embodiments, to function as a trusted model device, a non-3GPP device is configured with a 3GPP compatible universal connectivity stack (UCS). The UCS may comprise software for creating a secure tunnel using 3GPP authentication and security protocols to functionally extend the N3 user plane tunnel from an
(Continued)

600

CREATING AN EXTENDED USER PLANE TUNNEL FROM A USER EQUIPMENT (UE) THROUGH A NON-3GPP ACCESS NETWORK TO A USER PLANE FUNCTION (UPF) OF AN OPERATOR CORE NETWORK FOR A TELECOMMUNICATIONS NETWORK, THE EXTENDED USER PLANE TUNNEL ESTABLISHED BASED AT LEAST ON A 3GPP-BASED AUTHENTICATION PROTOCOL PERFORMED BY THE UE WITH THE OPERATOR CORE NETWORK
B610

COLLECTING A SET OF EVENT DATA REPRESENTING NETWORK EVENTS CORRESPONDING TO USE OF THE ONE OR MORE SERVICES OF THE OPERATOR CORE NETWORK BY THE UE
B612

COMMUNICATING THE SET OF EVENT DATA VIA THE EXTENDED USER PLANE TUNNEL FOR RECORDATION IN AN EVENT LEDGER
B614

N3IWF of the core network to the UCS within the non-3GPP device.

20 Claims, 9 Drawing Sheets

(58) Field of Classification Search
CPC ..... H04W 12/069; H04W 4/24; H04W 12/71; H04W 76/10; H04W 56/00; H04W 12/37; H04W 76/12; H04W 8/24; H04W 88/02; H04W 12/03; H04W 48/20; H04W 12/04; H04W 12/043; H04W 12/10
See application file for complete search history.

(56) References Cited

U.S. PATENT DOCUMENTS

| | | | |
|---|---|---|---|
| 11,636,471 B2 * | 4/2023 | Thibodeau | G06Q 20/3829 705/71 |
| 2018/0157700 A1 | 6/2018 | Roberts et al. | |
| 2019/0380031 A1 * | 12/2019 | Suthar | H04M 15/8016 |
| 2023/0247094 A1 * | 8/2023 | Wang | G06F 16/182 709/217 |

OTHER PUBLICATIONS

Chaer, A., et al., "Blockchain for 5G: Opportunities and Challenges", 2019 IEEE Globecom Workshops (GC Wkshps), pp. 1-6 (Dec. 2019).

Pandita, S., "Case for Blockchain in 5G", HCL Technology Ltd., pp. 1-3 (Feb. 25, 2021).

Costa, F. Z. D. N., et al., "Distributed Repository for Software Packages Using Blockchain", IEEE Access, vol. 10, pp. 112502-112514 (Oct. 25, 2022).

Spasovski, J., and Eklund, P., "Proof of Stake Blockchain: Performance and Scalability for Groupware Communications", ME-DES '17: Proceedings of the 9th International Conference on Management of Digital EcoSystems, pp. 1-8 (Nov. 2017).

* cited by examiner

400

RADIO MODULE 410

RF TX PATH CIRCUITS
412

RF RX PATH CIRCUITS
414

CONTROLLER
416

OPERATING SYSTEM
418

APPLICATION LAYER 420

APPLICATIONS 422

UCS 111

EVENT REPORTER
160

TRUSTED EXECUTION ENVIRONMENT 430

REPORTER DAPP
310

WIRED NETWORK INTERFACE 432

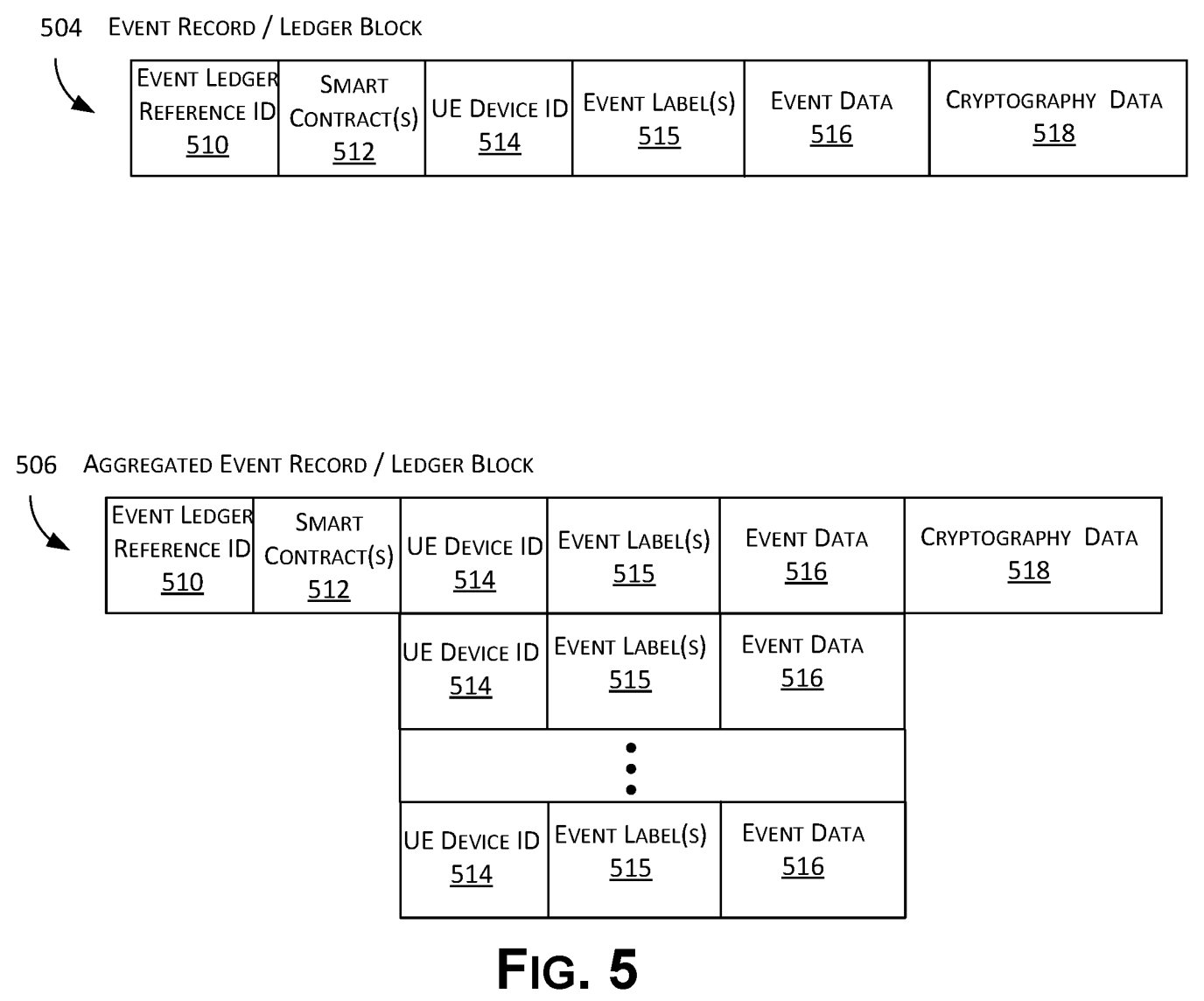

504  EVENT RECORD / LEDGER BLOCK

| EVENT LEDGER REFERENCE ID 510 | SMART CONTRACT(S) 512 | UE DEVICE ID 514 | EVENT LABEL(S) 515 | EVENT DATA 516 | CRYPTOGRAPHY DATA 518 |
|---|---|---|---|---|---|

506  AGGREGATED EVENT RECORD / LEDGER BLOCK

| EVENT LEDGER REFERENCE ID 510 | SMART CONTRACT(S) 512 | UE DEVICE ID 514 | EVENT LABEL(S) 515 | EVENT DATA 516 | CRYPTOGRAPHY DATA 518 |
|---|---|---|---|---|---|
| | | UE DEVICE ID 514 | EVENT LABEL(S) 515 | EVENT DATA 516 | |
| | | | • • • | | |
| | | UE DEVICE ID 514 | EVENT LABEL(S) 515 | EVENT DATA 516 | |

FIG. 5

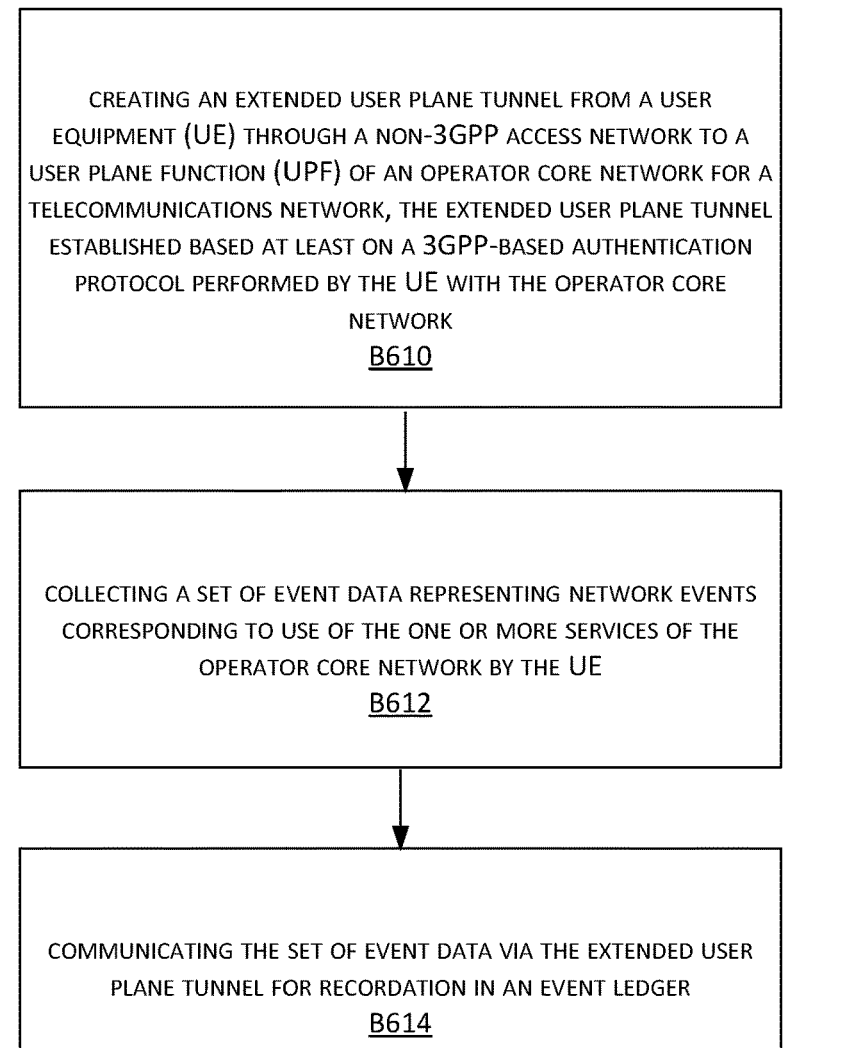

600

CREATING AN EXTENDED USER PLANE TUNNEL FROM A USER EQUIPMENT (UE) THROUGH A NON-3GPP ACCESS NETWORK TO A USER PLANE FUNCTION (UPF) OF AN OPERATOR CORE NETWORK FOR A TELECOMMUNICATIONS NETWORK, THE EXTENDED USER PLANE TUNNEL ESTABLISHED BASED AT LEAST ON A 3GPP-BASED AUTHENTICATION PROTOCOL PERFORMED BY THE UE WITH THE OPERATOR CORE NETWORK
B610

COLLECTING A SET OF EVENT DATA REPRESENTING NETWORK EVENTS CORRESPONDING TO USE OF THE ONE OR MORE SERVICES OF THE OPERATOR CORE NETWORK BY THE UE
B612

COMMUNICATING THE SET OF EVENT DATA VIA THE EXTENDED USER PLANE TUNNEL FOR RECORDATION IN AN EVENT LEDGER
B614

MEMORY

712

PROCESSOR(S)

714

PRESENTATION
COMPONENT(S)

716

RADIO(S)

724

I/O PORT(S)

718

I/O COMPONENTS

720

POWER SUPPLY

722

710

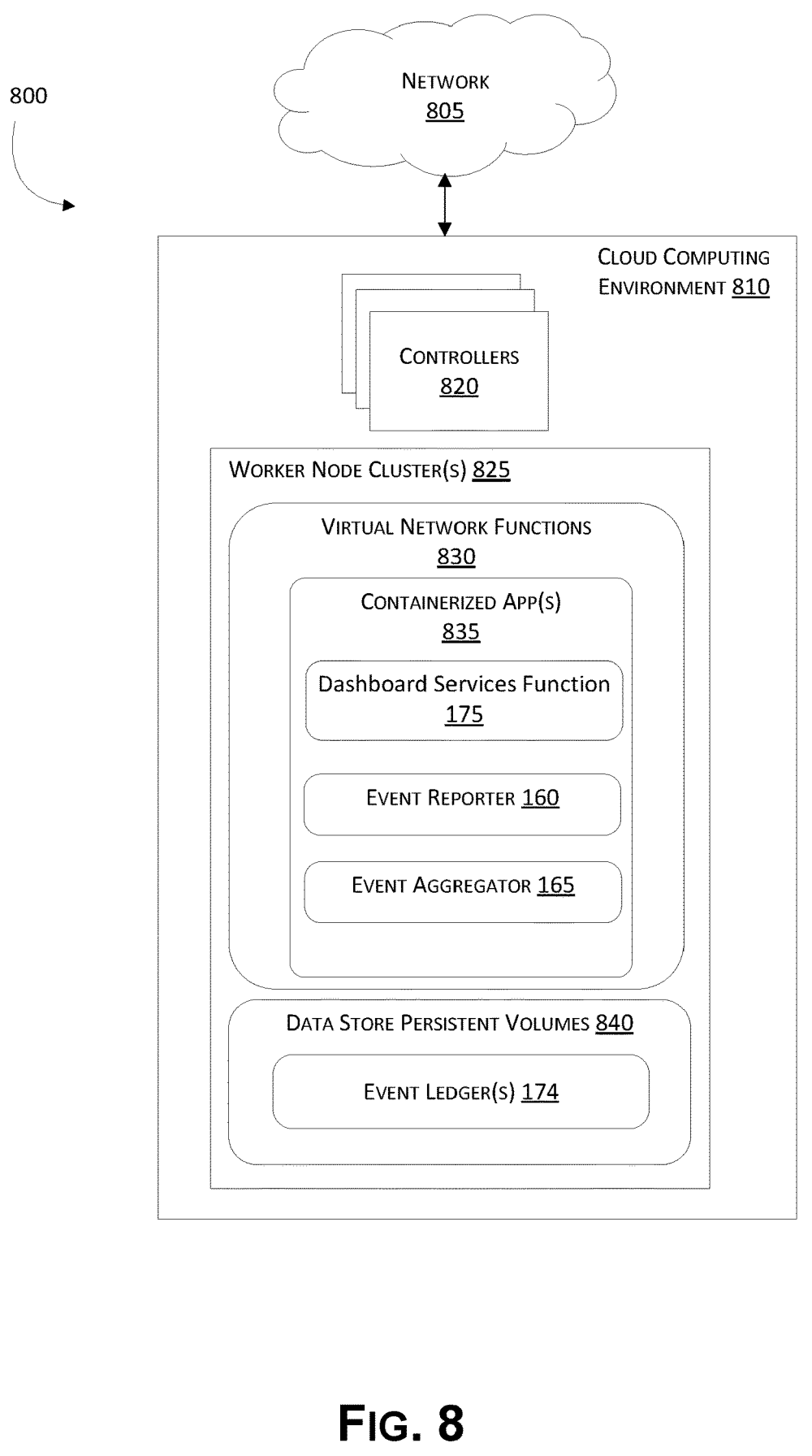

800

NETWORK
805

CLOUD COMPUTING
ENVIRONMENT 810

CONTROLLERS
820

WORKER NODE CLUSTER(S) 825

VIRTUAL NETWORK FUNCTIONS
830

CONTAINERIZED APP(S)
835

Dashboard Services Function
175

EVENT REPORTER 160

EVENT AGGREGATOR 165

DATA STORE PERSISTENT VOLUMES 840

EVENT LEDGER(S) 174

FIG. 8

LEDGER-BASED TELECOMMUNICATIONS NETWORK EVENT ARCHIVING FOR TRUSTED MODEL NON-3GPP DEVICES AND SYSTEMS

BACKGROUND

Telecommunications networks today are designed around subscriber identity module (SIM) technology and a handset perspective where SIM-based devices are trusted devices that can directly access functions, resources and services offered by the 5G operator core network. Through a SIM card, or equivalent SIM-like functionality, the device can gather information it needs from the network to operate on the network, and the network can gather the information it needs from the device to permit the device to operate on the network. Currently, devices that do not use a SIM card, or equivalent SIM-like functionality, are non-trusted devices that may connect to the telecommunications network via a secure connection to a gateway interface referred to as the network's non-3GPP Inter-Working Function (N3IWF). The N3IWF facilitates integration of wireless networks (e.g., Wi-Fi) and wired networks (e.g., wide area networks (WANs) and local area network (LANs)) into a 5G core network, and thus provides non-3GPP devices a means through which they can establish connectivity with the 5G core network.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments presented in the disclosure provide for, among other things, ledger-based telecommunications network event archiving for trusted model non-3GPP devices and systems. In some embodiments, to function as a trusted model device, a non-3GPP device is configured with a 3GPP compatible universal connectivity stack (UCS). The UCS may comprise software for creating a secure tunnel using 3GPP authentication and security protocols to functionally extend an N3 user plane tunnel from an N3IWF of the core network to the UCS within the non-3GPP device. The UCS thus opens access for the non-3GPP device to Application Programming Interfaces (APIs) and services of the telecommunications network/operator core network otherwise accessible to SIM-based 3GPP devices that connect through a radio access network (RAN), such as a cellular base station.

Trusted model non-3GPP devices can access network functions and services of the telecommunications network to utilize a ledger-based event recordation service. Through the service, network events associated with trusted model non-3GPP user equipment (UE) device usage of network functions and services may be recorded to an immutable event ledger. The event ledger may comprise, for example, hyperledger and/or blockchain technology. The event ledger may comprise an element of a distributed ledger network (DLN) and/or distributed ledger technology (DLT)-based records repository.

BRIEF DESCRIPTION OF THE DRAWINGS

Aspects of the present disclosure are described in detail herein with reference to the attached Figures, which are intended to be exemplary and non-limiting, wherein:

FIG. 5 is a diagram illustrating example event records for recordation to an event ledger, in accordance with some embodiments described herein;

FIG. 6 is a flow chart illustrating an example method for ledger-based telecommunications network event archiving, in accordance with some embodiments described herein;

FIG. 8 is an example cloud computing platform, in accordance with some embodiments described herein.

DETAILED DESCRIPTION

Figure 1:
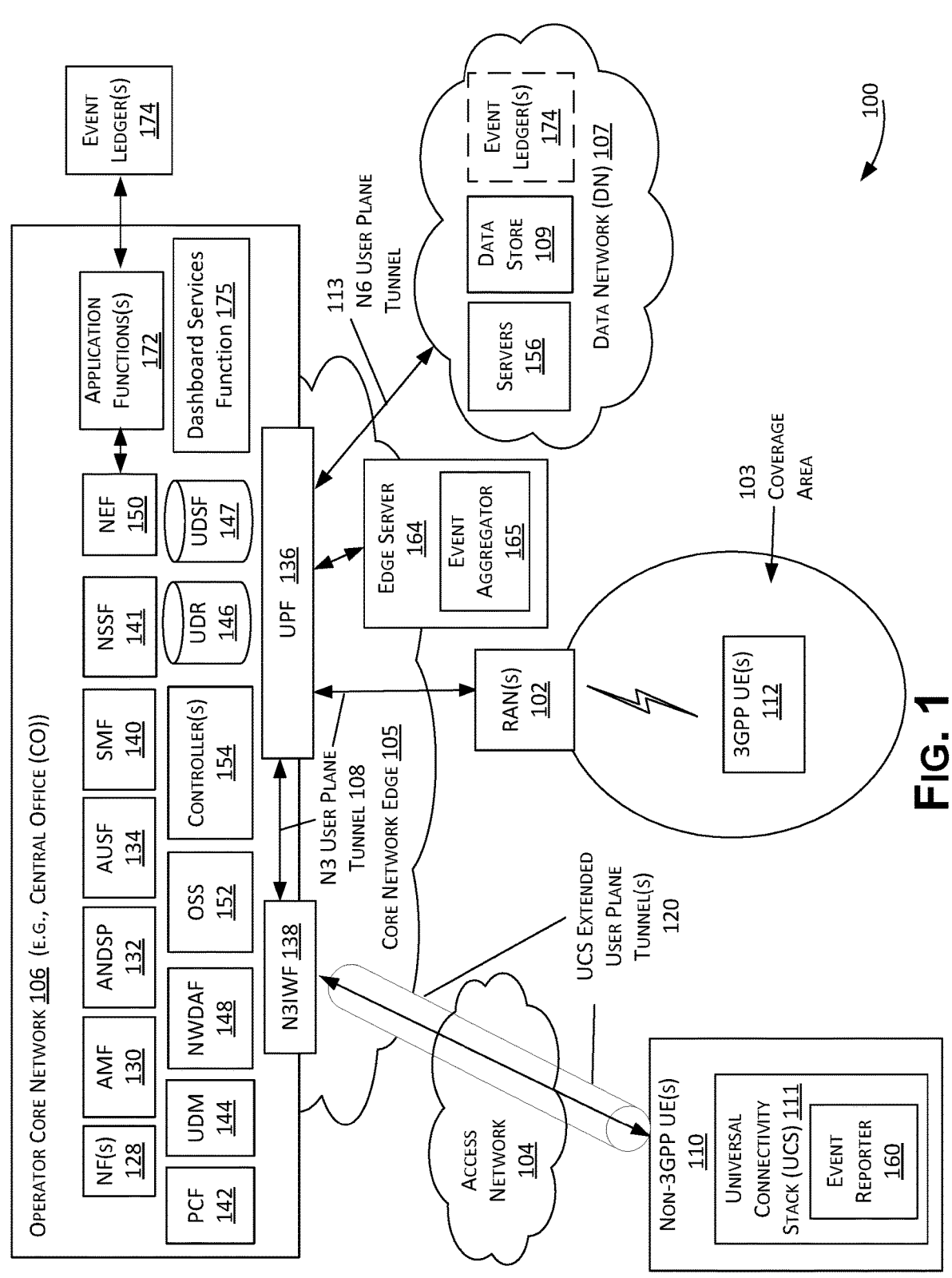
FIG. 1 is a diagram illustrating an example network environment for a telecommunications network, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

One or more of the embodiments presented in the disclosure provide for, among other things, ledger-based telecommunications network event archiving for trusted model non-3GPP devices and systems. The use of ledger technologies such as hyperledger, blockchain, distributed ledger networks, and distributed ledger technology, for maintaining event records adds an extra layer of security and immutability to the data, making it tamper-proof and reliable. Furthermore, the integration of a 3GPP compatible universal connectivity stack (UCS) within non-3GPP devices, as further detailed herein, permits such user equipment to establish secure tunnels using 3GPP authentication and security protocols. These secure tunnels not only facilitate interoperability but also enhance the overall security of the network, ensuring that trusted model non-3GPP devices can seamlessly and securely access network functions, and also adding a level of trust that event data stored to an immutable event ledger is accurate.

Currently, devices that do not use a SIM card, or equivalent SIM-like functionality, are considered non-trusted devices by 5G telecommunications networks that may be permitted to connect in order to communicate data, but are not able to access the services of network functions and/or resources available from the operator core network (e.g., network slicing or access to application functions exposed by the core network). As opposed to having the ability to directly access a network's user plane function (such as trusted 3GPP devices can do once connected to a radio access network), non-trusted devices connect to the N3IWF via a secure tunnel (e.g., an IPsec tunnel) that terminates at the N3IWF, and the N3IWF establishes the N3 user plane tunnel to the user plane function.

Traditional non-3GPP devices include devices such as, but not limited to, personal computers, desktop workstations, laptop, and/or network-connected peripherals. The rapid expansion of network-connected Internet-of-Things (IoT) devices has led to a substantial increase in both the number of, and types of, non-3GPP devices that are connecting through networks to perform one or more of their functions. At the same time, there is an increase in adoption of utilizing 5G telecommunications network infrastructures beyond mobile cellular into applications such as home and commercial internet services and for industrial/enterprise networking. That said, as non-trusted devices, the network services available to non-3GPP devices on the 5G telecommunications network is limited compared to the network services available to 3GPP devices.

To address these and other limitations of non-3GPP devices, proposals are under development for forthcoming revisions of 3GPP standards to adopt a trusted model for non-3GPP devices—with such devices becoming trusted network elements (e.g., network nodes) of the telecommunications network to at least some degree. A trusted model non-3GPP device, for example, may be permitted to establish a limited bandwidth secure user plane tunnel to an operator network core user plane function (UPF) that provides the non-3GPP device access to network slicing, 3GPP encryption, exposure to application functions, and/or other network functions. While the benefits of providing this enhanced network connectivity to non-3GPP device are considerable, the network operator is faced with a substantial increase in the number of trusted devices on the network with access to network functions and resources, and accordingly this results in a corresponding increase in the number of network events to be monitored, tracked, and recorded.

In some embodiments, to function as a trusted model device, a non-3GPP device is configured with a 3GPP compatible universal connectivity stack (UCS). The UCS may comprise software for creating a secure tunnel (e.g., an IPsec tunnel) using 3GPP authentication and security protocols to functionally extend an N3 user plane tunnel from an N3IWF of the core network to the UCS within the non-3GPP device. This UCS extended user plane tunnel functionally extends the core network N3 user plane interface through the N3IWF to the interface with the non-3GPP device (e.g., to an interface with the UCS), which opens access for the non-3GPP device to Application Programming Interfaces (APIs) and services of the telecommunications network/operator core network otherwise accessible to SIM-based 3GPP devices that connect through a radio access network (RAN), such as a cellular base station. Unlike customary security protocols between a non-3GPP device and the N3IWF, in some embodiments the UCS extended user plane tunnel may not be established until the 3GPP authentication procedures between the UCS and the operator core network are completed. Once completed, data traffic through the UCS extended user plane tunnel is secure and can directly be transported on the user plane (e.g., through the UPF) of the operator core network. As such, non-cellular devices based on, for example, WiFi, Zigbee, wired Ethernet, and/or other connectivity technology, can nonetheless obtain the same functionalities on the telecommunications network as a cellular device. Moreover, through the UCS, non-3GPP network infrastructure devices, such as but not limited to, gateways, switches, routers, boarder controllers, and the like, can also become trusted model non-3GPP devices in the same way as IoT devices and user-operated computer devices, such as personal computers, desktop workstations, and/or laptops.

In some embodiments, the UCS may execute one or more device identity technologies to provide the trusted model non-3GPP device with a quasi-SIM device identity that is used by the operator core network to uniquely identify the trusted model non-3GPP device and presents the trusted model non-3GPP device to the operator core network as a SIM-compliant device. For example, the UCS may present a device identity based on decentralized identifiers (DIDs) and/or on a self-sovereign identity (SSI) paradigm, such as World Wide Web Consortium (W3C) DIDs, for example. For example, a DID offered by the UCS as the identity for the trusted model non-3GPP device may resolve to a DID document stored at a data registry (e.g., a verifiable data registry) and/or include cryptographic public keys that the UCS may use to authenticate the trusted model non-3GPP device to the operator core network. The quasi-SIM device identity may thus be used to provide the trusted model non-3GPP device with an identity that can be used to access subscription-based services available from the operator core network.

FIG. 1 is a diagram illustrating an example network environment 100 embodiment for a wireless communication system. Network environment 100 is but one example of a suitable telecommunications network and is not intended to suggest any limitation as to the scope of use or functionality of the embodiments disclosed herein, and nor should the network environment be interpreted as having any dependency or requirement relating to any one or combination of components illustrated.

As shown in FIG. 1, network environment 100 comprises an operator core network 106 (also referred to as a "core network") that provides one or more network services to one or more user equipment (UE) devices that include trusted model non-3GPP UE 110 (e.g., trusted model non-3GPP devices) and 3GPP UE 112 (e.g., SIM-based 3GPP devices). The trusted model non-3GPP UE 110 may access the operator core network 106 using a wired and/or wireless connection via an access network (AN) 104. The 3GPP UE 112 may access the operator core network 106 via a radio access network (RAN) 102 (e.g., a cellular base station). In some embodiments, network environment 100 comprises, at least in part, a wireless communications network.

As described herein, because trusted model non-3GPP UEs 110 can access network functions and services accessible to 3GPP UE 112, network environment 100 implements a service through which network events associated with a trusted model non-3GPP UE 110's use of the network functions and services may be recorded to an event ledger 174.

In some embodiments, the event ledger 174 may be implemented through one or more application functions 172 exposed through a network exposure function (NEF) 150 network function of the operator core network 106. In some embodiments, the NEF 150 may expose the event ledger 174 as a service accessible through at least one data network (DN) 107 coupled to the operator core network 106.

As shown in FIG. 1, individual trusted model non-3GPP UEs 110 include a universal connectivity stack (UCS) 111 that includes an event reporter 160. The event reporter 160 may collect event data for recording to the event ledger 174, for example, by observing interactions between the UCS 111 and the operator network core 106 and/or by monitoring data traffic between the trusted model non-3GPP UEs 110 and the operator network core 106. In some embodiments, an event reporter 160 may directly interact with the NEF 150 exposed application function(s) 172 in order to record event records to the event ledger 174. In some embodiments an event reporter 160 may send event records to an event aggregator 165. The event aggregator 165 may interact with the NEF 150 exposed application function(s) 172 in order to record curated sets of aggregated event records to the event ledger 174. In some embodiments, the event aggregator 165 may be a function hosted by one or more edge servers 164 (e.g., a node) of the core network edge 105. As such, functions described herein attributed to the event aggregator 165 may be implemented by code executed by one or more processors of such edge server(s) 164. In some embodiments, the event aggregator 165 may be implemented at least in part by a computing device 700, such as is described with respect to FIG. 7 and/or a cloud computing environment 800, such as is described with respect to FIG. 8.

In some embodiments, the event ledger 174 is a block-chain technology and/or hyperledger-based technology ledger storing event data associated with trusted model non-3GPP UE 110 and/or 3GPP UE 110 as immutable data records. For example, in some embodiments, the UCS 111 and/or event aggregator 165 may execute one or more decentralized applications (DApps) or other applications based on blockchain technology to record records to the event ledger 174.

As shown in FIG. 1, the network environment 100 may comprise one or more radio access networks (RANs) 102. Each RAN 102 may provide wireless connectivity access to one or more UEs 112 operating within a coverage area 103 associated with that RAN 102. A RAN is often referred to as a base station, cell site, or cellular base station. The RAN 102 may implement wireless connectivity using, for example, 3GPP technologies. The RAN 102 may be referred to as an eNodeB in the context of a 4G Long-Term Evolution (LTE) implementation, a gNodeB in the context of a 5G New Radio (NR) implementation, or other terminology, depending on the specific implementation technology. In some embodiments, the RAN 102 may comprise, at least in part, components of a customer premises network, such as a distributed antenna system (DAS), for example.

The access network 104 may comprise a non-3GPP customer premises network, such as a local area network or intranet. The access network 104 may provide wired and/or wireless access to one or more elements of a customer infrastructure network (e.g., an enterprise infrastructure network) via a customer premise gateway. The access network 104 may provide access to one or more non-3GPP UEs 112 via wired connections and/or wireless access points (WAPs) such as, but not limited to, IEEE 802.11 (WiFi) and/or IEEE 802.15 (Bluetooth) access points. As discussed herein, the non-3GPP UEs 112 may comprise trusted model non-3GPP UEs that implement a 3GPP compatible universal connectivity stack (UCS) 111 to establish an extended user plane tunnel 120 through the access network 104 to the operator core network 106.

One or both of radio access network 102 and/or access network 104 may comprise a multimodal network (for example, comprising one or more multimodal access devices) where multiple radios supporting different systems are integrated into the networks 102 and 104. Such a multimodal access network may support a combination of 3GPP radio technologies (e.g., 4G, 5G, and/or 6G) and/or non-3GPP radio technologies. In some embodiments, the radio access network 102 may comprise a terrestrial wireless communications base station and/or may be at least in part implemented as a space-based access network, such as a base station implemented by an Earth-orbiting satellite.

3GPP UE 112 may communicate with the operator core network 106 via the RAN 102 over one or both of uplink (UL) radio frequency (RF) signals and downlink (DL) radio frequency (RF) signals. Individual UE 110 may communicate with the operator core network 106 as trusted model non-3GPP devices via the access network 104 over one or both of uplink (UL) radio frequency (RF) signals and downlink (DL) radio frequency (RF) signals, and/or via wired network connections. In some embodiments, a UE may include functionality to operate at a 3GPP UE 112 that connects through a RAN 102 and to operate as a non-3GPP UE 110 that connects through an access network 104.

The radio access networks 102 and/or access network 104 may be coupled to the operator core network 106 via a core network edge 105 that comprises wired and/or wireless network connections that may themselves include wireless relays and/or repeaters. In some embodiments, the RAN 102 and/or access network 104 may be coupled to the operator core network 106 at least in part by a backhaul network such as the Internet or other public or private network infrastructure. Core network edge 105 may comprise one or more network nodes or other elements of the operator core network 106 that may define the boundary of the operator core network 106 and may serve as the architectural demarcation point where the operator core network 106 connects to other networks such as, but not limited to, RAN 102 and/or access network 104, the Internet, and/or other third-party networks. In some embodiments, the network edge 105 may comprise one or more network nodes that include edge server(s) 164. Edge server(s) 164 may provide, for example, edge-based services to UE 110 that may be accessed separately from services provided by network functions of the operator core network 106. For example, edge server(s) 164 may host databases, caches, microservices, ledgers, decentralized applications (e.g., DApps), and/or may perform data traffic monitoring, inspections, and/or aggregation for other network functions of the network environment 100. In some embodiments, edge server(s) 164 may host an event aggregator 165 that collects event reports from the UCS 111 of trusted model non-3GPP UE(s) 110 for recordation to an event ledger, as discussed herein.

It should be understood that in some aspects, the network environment 100 may not comprise a distinct operator core network 106, but rather may implement one or more features of the operator core network 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). Data network 107 may include a data store 109. In some embodiments, trusted model non-3GPP UE(s) 110 and 3GPP UE(s) 112 may access services and/or content provided by one or more content-services servers 156 and/or data store(s) 109 of DN 107.

Generally, an individual trusted model non-3GPP UE(s) 110 and 3GPP UE(s) 112 may comprise a device capable of unidirectional or bidirectional communication with the operator core network 106 via wireless and/or wired communication links. The network environment 100 may be configured for wirelessly connecting trusted model non-3GPP UE(s) 110 and 3GPP UE(s) 112 to other trusted model non-3GPP UE(s) 110 and 3GPP UE(s) 112 via the same access networks (e.g., 102 and 104), via other access networks, via other telecommunication networks, and/or to connect trusted model non-3GPP UE(s) 110 and 3GPP UE(s) 112 to a public switched telecommunication network (PSTN).

The network environment 100 may be generally configured for connecting a trusted model non-3GPP UE(s) 110 and 3GPP UE(s) 112 to data or services that may be accessible on one or more application servers or other functions, nodes, or servers. The network environment 100 may be generally configured, in some embodiments, for connecting trusted model non-3GPP UE(s) 110 and 3GPP UE(s) 112 to data, content, and/or services that may be accessible from one or more application servers or other functions, nodes, or servers (such as by servers 156 of data network 107). In allocating network resources and access to these data or services, the operator core network 106 may execute one or more network slices that each implements a network slice trust architecture. Within the context of the network slice, an individual trusted model non-3GPP UE(s) 110 and 3GPP UE(s) 112, like the network slice functions described herein, may function in the capacity of a subject entity that requests services from other network slice functions and/or a resource entity that provides services to other network slice functions within their network slice implemented by environment 100.

Trusted model non-3GPP UE(s) 110 and 3GPP UE(s) 112 are in general forms of equipment and machines such as, but not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. Trusted model non-3GPP UE(s) 110 and 3GPP UE(s) 112 may include network infrastructure devices, such as but not limited to network switches, routers, gateways, boarder controllers, and the like. In some embodiments, trusted model non-3GPP UE(s) 110 and 3GPP UE(s) 112 may include computing devices such as, but not limited to, handheld personal computing devices, cellular phones, smart phones, tablets, laptops, and similar consumer equipment, or stationary desktop computing devices, workstations, servers, and/or network infrastructure equipment. As such, the trusted model non-3GPP UE(s) 110 and 3GPP UE(s) 112 may include both mobile UE and stationary UE. A trusted model non-3GPP UE(s) 110 and/or 3GPP UE(s) 112 can include one or more processors and one or more non-transient computer-readable media for executing code to carry out the functions of the trusted model non-3GPP UE(s) 110 and 3GPP UE(s) 112 described herein. The computer-readable media may include computer-readable instructions executable by the one or more processors. In some embodiments, a trusted model non-3GPP UE(s) 110 and/or 3GPP UE(s) 112 may be implemented using a computing device 700, as discussed below with respect to FIG. 7.

In some implementations, the operator core network 106 may comprise modules, also referred to as network functions (NFs), generally represented in FIG. 1 as NF(s) 128. Such network functions may include, but are not limited to, one or more of a core access and mobility management function (AMF) 130, an authentication server function (AUSF) 134, a user plane function (UPF) 136, non-3GPP interworking function (N3IWF) 138, a session management function (SMF) 140, a network slice selection function (NSSF) 141, a policy control function (PCF) 142, unified data management (UDM) 144, a unified data repository (UDR) 146, an unstructured data storage function (UDSF) 147, a network data analytics function (NWDAF) 148, a network exposure function (NEF) 150, and an operations support system (OSS) 152. The operator core network 106 may also comprise an access network discovery and selection policy (ANDSP) 132, discussed below.

Implementation of these or other NFs and/or policies of the operator core network 106 may be executed by one or more controllers 154 on which these network functions are orchestrated or otherwise configured to execute utilizing processors and memory of the one or more controllers 154. The NFs may be implemented as physical and/or virtual network functions, container network functions, and/or cloud-native network functions, such as is described with respect to FIG. 8. Within the context of network slices created by the operator core network 106, the operator core network 106 may orchestrate individual dedicated instances of one or more of the network functions described herein to establish and support operation of a network slice.

Notably, the nomenclature used herein is used primarily with respect to the 3GPP 5G architecture. In other aspects, one or more of the network functions of the operator core network 106 may take different forms, including consolidated or distributed forms that perform the same general operations. For example, the AMF 130 in the 3GPP 5G architecture is configured for various functions relating to security and access management and authorization, including registration management, connection management, paging, and mobility management. In other forms, such as a 4G architecture, the AMF 130 of FIG. 1 may take the form of a mobility management entity (MME). The operator core network 106 may be generally said to authorize rights to and facilitate access to an application server/service, such as provided by application function(s) requested by one or more UEs, such as trusted model non-3GPP UE(s) 110 and/or 3GPP UE(s) 112. In some embodiments, the NSSF 141 works in conjunction with the AMF 776 to establish network slice instances, such as is described herein.

As shown in FIG. 1, UPF 136 represents at least one function of the operator core network 106 that may extend into the core network edge 105. In some embodiments, the RAN 102 is coupled to the UPF 136 within the core network edge 105 by a communication link that includes an N3 user plane tunnel 108. For example, the N3 user plane tunnel 108 may connect a cell site router of the RAN 102 to an N3 interface of the UPF 136. In some embodiments, trusted model non-3GPP UE(s) 110 may connect to the UPF 136 through an extended user plane tunnel 120 created with a UCS 111. The data store 109 may be coupled to the UPF 136 in the core network edge 105 by an N6 user plane tunnel 113. For example, the N6 user plane tunnel 113 may connect a network interface (e.g., a switch, router, and/or gateway) of the DN 107 to an N6 interface of the UPF 136. In some embodiments, the operator core network 106 may comprise a plurality of UPFs 136, such as a UPF at the operator core network 106 and a UPF at the core network edge 105. For example, a UPF at the core network edge 105 may be used for local breakout and/or low latency types of application via an N9 interface between the two UPFs.

The AMF 130 facilitates mobility management, registration management, and connection management for 3GPP devices, such as UE 112. ANDSP 132 facilitates mobility management, registration management, and connection management for non-3GPP devices, such as trusted model non-3GPP UE 110. As a policy, the ANDSP 132 may comprise a data structure containing policy information that may be is used to control the UE behavior related to access network discovery and selection over non-3GPP access network, and may be provisioned by the PCF 142. While the AMF 130 is the network function that manages the mobility and registration, the ANDSP 132 can be used (in precedence) by UE when selecting which network they should connect to. AUSF 134 may receive authentication requests from the AMF 130 and interacts with UDM 144, for example, for SIM authentication of 3GPP UE(s) 112 and/or to authenticate a trusted model non-3GPP UE 110 based on a quasi-SIM device identification, such as DIDs.

N3IWF 138 provides a secure gateway for non-3GPP network access. For example, the N3IWF 138 may be used for providing connections for non-3GPP UE access to the operator core network 106 over a non-3GPP access network. For example, a data link may be established between a customer premise gateway and the N3IWF 138 via access network 104. In some embodiments, the N3IWF may be used for providing connections for trusted model non-3GPP UE 110 to access the operator core network 106 using 3GPP via the extended user plane tunnel 120 based on 3GPP authentication and security protocols and/or the quasi-SIM device identification.

SMF module 140 facilitates initial creation of protocol data unit (PDU) sessions using session establishment procedures. The PCF 142 maintains and applies policy control decisions and subscription information. Additionally, in some aspects, the PCF 142 maintains quality-of-service (QoS) policy rules. For example, the QoS rules stored in a unified data repository (UDR) 146 can identify a set of access permissions, resource allocations, or any other QoS policy established by an operator. The Unstructured Data Storage Function (UDSF) 147 may store dynamic state data, which is structured and unstructured data related to network function of the operator core network 106. That is, the UDSF 147 may support storage and retrieval of structured and/or unstructured data by other network functions 128 of the operator core network 106, including information relating to access control and service and/or microservice subscriptions.

In some embodiments, the PCF 142 maintains subscription information indicating one or more services and/or microservices subscribed to by each trusted model non-3GPP UE(s) 110 and 3GPP UE(s) 112. For example, in some embodiments, recording of UE-related network events to an event ledger may be made available to UE as a network service as a microservice subscription. In some embodiments, the event aggregator 165 may access PCF 142 and/or UDSF 147 to obtain subscription information pertaining to trusted model non-3GPP UE(s) 110 and/or 3GPP UE(s) 112 subscriptions to the event ledger recording service. Based on confirmation of an active subscription, the event aggregator 165 may accept event records from the UCS of a trusted model non-3GPP UE(s) 110 for recordation to ledger 174. The NEF 150 may function to securely expose network functions and/or interfaces, for example, by creating a link between the operator core network 106 and an external application. The NEF 150 provides an interface for application functions (AFs) 172 to securely provide information to nodes on or connected to the operator core network 106 and/or core network edge 105. An AF 172 may provide one or more application services to subscribed UE such as trusted model non-3GPP UE(s) 110 and/or 3GPP UE(s) 112. In some embodiments, the interface between the NEF 150 and AF 172 may be referred to as the northbound interface of the NEF 150. In some embodiments, the NEF 150 may grant a trusted model non-3GPP UE(s) 110 access to one or more application functions 172 for recording an event to the ledger 174 based on confirmation of an active subscription from information provided by the PCF 142 and/or UDSF 147.

In some embodiments, a PCF may maintain subscription information pertaining to trusted model non-3GPP UE(s) 110 and/or 3GPP UE(s) 112 authorized to access services from within a network slice. The UDM 144 manages network user data including, but not limited to, data storage management, subscription management, policy control, and operator core network 106 exposure. NWDAF 148 collects data (for example, from UE; other network functions; application functions; and operations, administration, and maintenance (OAM) systems) that can be used for network data analytics. The OSS 152 is responsible for the management and orchestration of the operator core network 106 and the various physical network functions, virtual network functions, container network functions, controllers, computer nodes, and other elements that implement the operator core network 106.

Some aspects of network environment 100 include the UDR 146 storing information relating to access control and service and/or microservice subscriptions. The UDR 146 may be configured to store information relating to such subscriber information and may be accessible by multiple different network functions (NFs) 128 in order to perform desirable functions. For example, the UDR 146 may be accessed by the AMF 130 in order to determine subscriber information pertaining to a trusted model non-3GPP UE(s) 110 and/or 3GPP UE(s) 112, accessed by a PCF 142 to obtain policy-related data, accessed by NEF 150 to obtain data that is permitted for exposure to third-party applications (such as applications executed by a trusted model non-3GPP UE(s) 110 and/or 3GPP UE(s) 112, for example). Other functions of the NEF 150 include monitoring of UE-related events and posting information about those events for use by external entities, and providing an interface for provisioning UEs (via PCF 142) and reporting provisioning events to the UDR 146. Although depicted as a unified data management module, UDR 146 can be implemented as a plurality of network function specific data management modules. As mentioned above, in the context of a network slice, the operator core network 106 may orchestrate individual instances of each of these network functions and other such network functions described herein that are dedicated to the network slice.

The UPF 136 is generally configured to facilitate user plane operation relating to packet routing and forwarding, interconnection to a data network (e.g., DN 107), policy enforcement, and data buffering, among other operations. Using network slicing (e.g., based on 5G software-defined networking managed by the 5G network slice selection function (NSSF) 141), the UPF 136 may establish a dedicated network slice function for one or more data channels between various network functions and other entities that act as, in essence, a distinct network (for example, establishing its own QoS, provisioning, and/or security) within the same physical network architecture of network environment 100.

In some embodiments, the access network 104 comprises a non-3GPP access network 104 (e.g., a customer premise equipment (CPE)/enterprise network) such as a wide area network (WAN) or local area network (LAN) and/or may include one or more wireless access points (WAPs) used by one or more trusted model non-3GPP UEs 110. In such embodiments, the non-3GPP access network 104 may represent an untrusted network from the perspective of the operator core network 106.

Accordingly, UE that accesses the access network 104 other than through a UCS 111 may represent untrusted UE. Communication between the operator core network 106 and untrusted UE connecting via the access network 104 may be established via the non-3GPP Interworking Function (N3IWF) 138. For example, in some embodiments, a UE 110 may authenticate with a WAP of the access network 104 to establish a wireless communications link with the access network 104. In some embodiments, an untrusted non-3GPP UE may be coupled using a network cable to establish a wired network communication link with the access network 104.

A non-3GPP access network 104 may be coupled to, and authenticated with, the N3IWF 138 of the operator core network 106 via an IPsec user plane tunnel and/or IPsec control plane tunnel may be created to establish a secure communication link between the untrusted non-3GPP UE and the N3IWF 138. The N3IWF 138 may be coupled to the UPF 136 by a communication link that includes an N3 user plane tunnel 108. For example, the N3 user plane tunnel 108 may connect a router or network gateway of the non-3GPP access network 104 to an N3 interface of the UPF 136.

In contrast to an untrusted non-3GPP UE, a trusted model non-3GPP UE 110 authenticates with the operator core network 106 using 3GPP authentication and security protocols to create the extended user plane tunnel between the trusted model non-3GPP UE 110 and the UPF 136, such that the trusted model non-3GPP UE 110 itself becomes a trusted network node coupled to the UPF 136 of the operator core network 106.

Figure 2:
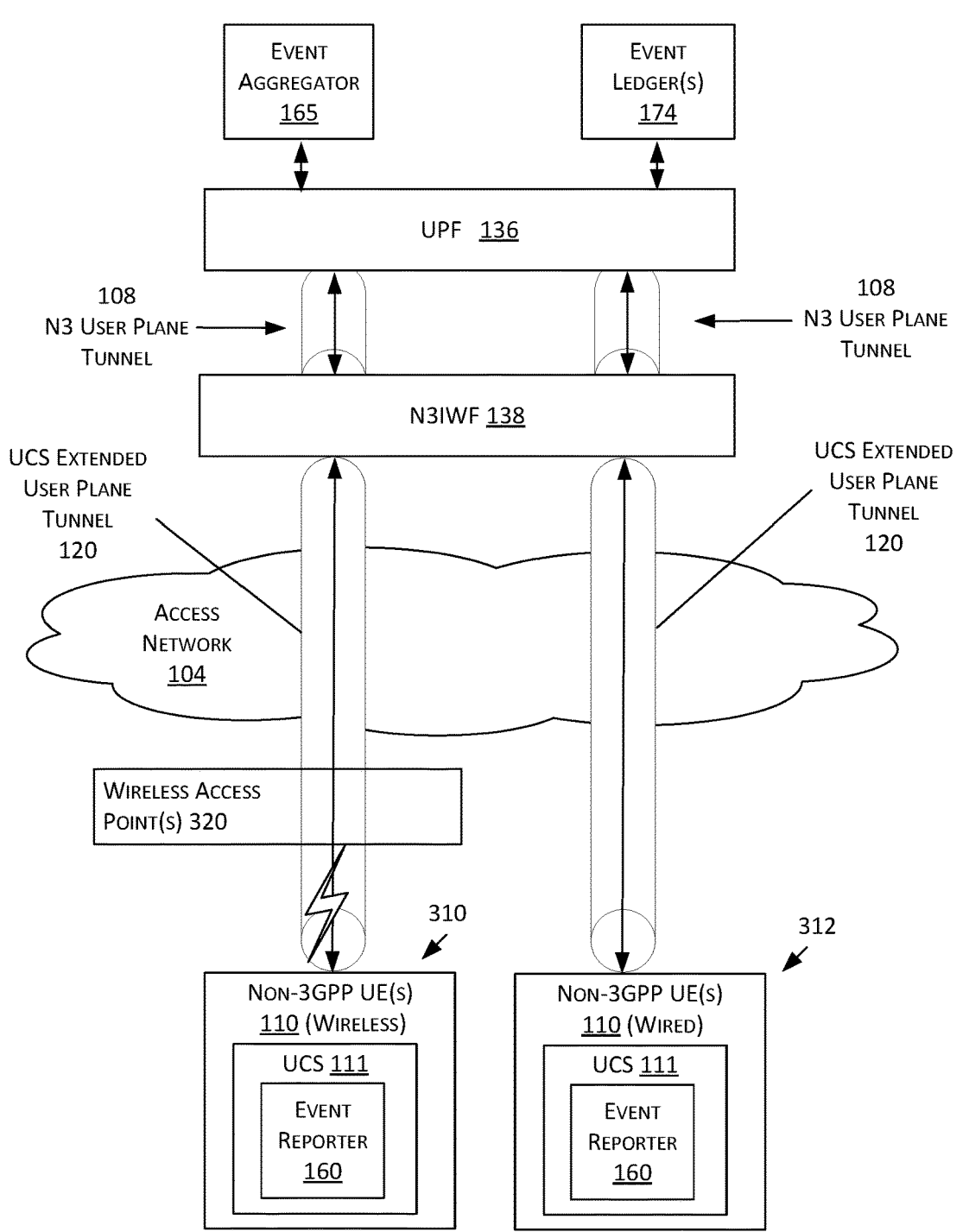
FIG. 2 is a diagram illustrating extended user plane tunnels for wired and wireless trusted model non-3GPP devices, in accordance with some embodiments described herein.

For example, referring now to FIG. 2, FIG. 2 illustrates example extended user plane tunnels established using the UCS 111 of a trusted model non-3GPP UE 110. In FIG. 2, the UPF 136 may be coupled to the N3IWF via an N3 user plane tunnels as shown in FIG. 1. Here, a first trusted model non-3GPP UE 110 comprises a wireless device that establishes a wireless RF link between the first trusted model non-3GPP UE 110 (shown at 310) and a wireless access point (WAP) 220 of the access network 104. Upon connecting with the WAP 220, the UCS 111 of the wireless trusted model non-3GPP UE 110 may initiate contact with the N3IWF 138 to begin 3GPP authentication and security protocols. Another trusted model non-3GPP UE 110 may comprise a wired device (shown at 312) that establishes a link between the trusted model non-3GPP UE 110 and the access network 104 through a network cable. Upon connecting with the WAP 220, the UCS 111 of the trusted model non-3GPP UE 310 may initiate contact with the N3IWF 138 to begin 3GPP authentication and security protocols.

In some embodiments, each trusted model non-3GPP UE 110 may initially connect to the access network 104 using the security procedures established by the access network 104 (e.g., a passkey). The UCS 111 of the trusted model non-3GPP UE 110 may register with the N3IWF 138 as a trusted model non-3GPP UE, and in response, the N3IWF 138 registers the trusted model non-3GPP UE 110 with the operator network core 106 (e.g., with the AMF 130 and/or SMF 140) as a trusted model non-3GPP UE using a quasi-SIM device identifier (ID), such as a DID. In some embodiments, registration of the trusted model non-3GPP UE 110 triggers the operator core network 106 to initiate sending the trusted model non-3GPP UE 110 an authentication request in order to prompt an authentication response. In some embodiments, the operator network core 106 initiates an Authentication and Key Management (AKA) procedure to authenticate the trusted model non-3GPP UE 110 to grant trusted access to the 3GPP network functions and services of the operator core network 106. For example, the AKA procedure may comprise a technology such as, but not limited to, 5G-Authentication and Key Management (5G-AKA), Extensible Authentication Protocol-Authentication and Key Management (EAP-AKA') and/or Extensible Authentication Protocol-Transport Layer Security (EAP-TLS). Once the trusted model non-3GPP UE 110 is authenticated, the extended user plane tunnel 120 may be instantiated to extend the N3 user plane tunnel to the trusted model non-3GPP UE 110. PDU and/or other sessions may then be established whereby the user data traffic for the trusted model non-3GPP UE 110 may begin to flow through the UPF 136 and be transported between the UPF 136 and the UE 110 via the extended user plane tunnel 120. With the extended user plane tunnel 120 established, the event reporter 160 may use the extended user plane tunnel 120 to transport event data via the UPF 136 for recordation in event ledger 174. In some embodiments, the event reporter 160 may communicate event data to the event aggregator 165, which updates the records of event ledger 174 based on aggregated event reports. In some embodiments, the event reporter 160 may communicate event data as event reports to the event ledger 174 independently of an event aggregator 165.

Referring again to FIG. 1, the event reporter 160 may be configured to collect and report types of event data based on a reporting policy that defines a set of preselected types of events to be reported. For example, the event reporter 160 may be configured by a reporting policy to report network events, such as when PDU sessions are created and discontinued, and related metadata. In some embodiments, network events reported by the event reporter 160 may include, for example, when a packet data connection between the trusted model non-3GPP UE 110 and a resource in the DN 107 (e.g., servers 156 and/or data store 109) is set up and/or torn down, and/or what, if any, network function services were used in conjunction with the packet data connection. For example, network event data associated with such packet data connections may be used by the network operator for forecasting system utilization and planning network upgrades. In other implementations, network event data associated with such packet data connections may be used by an enterprise associated with the accessed resource to track use of their resources. In other implementations, the reporting policy may designate reporting of network event data that may more generally be used by an enterprise to track interactions with trusted model non-3GPP UE 110 and/or 3GPP UE 112 that consume and/or supply data associated with that enterprise, and/or are otherwise operated based on data and/or control messages communicated with enterprise resources. For example, trusted model non-3GPP UE 110 may comprise network-controlled devices (e.g., IoT) devices, such as, but not limited to, thermostats, refrigerators, high-volume air-conditioning (HVAC) systems, building control systems, mobile autonomous or semi-autonomous machines, and/or industrial tools or machinery. In some embodiments, relevant network events reported by the event reporter 160 for such equipment may include, but is not limited to: physical-level network connection status (e.g., when the device is connected to a WiFi access point and/or connected by a network patch cable to a network access port), whether the device is in an active or inactive (e.g., sleep/standby) mode, changes to device setting, information about network data sessions (e.g., when the session is established, when the session is dropped), quality metrics (e.g., latency, dropped packets, packet retransmissions, etc.), data rates, quantities of data exchanged, flags indicating when thresholds are crossed, or any other type of event that the event reporter 160 is programmed to observe and report.

In some embodiments, event data collected by the event reporter 160 may be recorded to records of the event ledger 174 by the event reporter 160. For example, in some embodiments, the event reporter 160 may execute one or more decentralized applications (DApps), or other applications based on blockchain technology, to record event reports to the event ledger 174 (e.g., by writing a new record to event ledger 174). In some embodiments, the event reporter 160 may execute a DApp to execute a function or otherwise interact with a smart contract recorded in the event ledger 174 to record new records (e.g., blocks) to the event ledger 174. The new records may comprise event reports collected by the event reporter 160. In some embodiments, the event reporter 160 may label event reports with information such as, but not limited to, an identity of the trusted model non-3GPP UE 110 (e.g., the quasi-SIM device ID), an indication that the trusted model non-3GPP UE 110 is a non-3GPP device, an indication of the type of network event included in the event report, and indication of a network slice, domain, and/or other network partition a trusted model non-3GPP UE 110 may belong to. In some embodiments, such labels may be recorded with the event data to form a component of the record stored to the event ledger 174. Because the event reports are created by a UCS 111 of a trusted device authenticated by 3GPP protocols and transported through a secured and trusted transport path, the data stored to the event ledger 174 may be given a high degree of trust as accurately representing activities of that trusted model non-3GPP UE 110.

In some embodiments, the event reporters 160 of individual trusted model non-3GPP UEs 110 may transmit collected event data to the event aggregator 165. The event aggregator 165, in turn, may compile event data from multiple trusted model non-3GPP UEs 110 (and in some embodiments, also from 3GPP UEs 112) into event reports for recordation to the event ledger 174. Using the event aggregator 165 as an event data collection point may reduce the volume of traffic carrying event reports through the operator core network 106 and more efficiently utilize network bandwidth. Moreover, the event aggregator 165 may be used to organize and curate the event data received from the individual event reporter 160 to generate event reports that are more specifically directed to specific events and/or sets of the trusted model non-3GPP UEs 110. In some embodiments, the event aggregator 165 may execute one or more DApps, or other applications based on blockchain technology, to record event reports to the event ledger 174 (e.g., by writing a new record to event ledger 174). In some embodiments, the event aggregator 165 may execute a DApp to execute a function or otherwise interact with a smart contract recorded in the event ledger 174 to record new blocks to the event ledger 174 comprising event reports produced by the event aggregator 165. In some embodiments, the event aggregator 165 may label event reports based on labels provided by the individual event reporter 160. In other embodiments, the event aggregator 165 may augment, replace, or omit event labels provided by the individual event reporter 160. For example, an event label applied by the event aggregator 165 may tag an event report as being associated with a specific enterprise customer and/or other criteria, such as the network slice, domain, or network partition the event report is associated with. In some embodiments, event labels may be recorded with the event data to form a component of the event report record stored to the event ledger 174 by the event aggregator 165.

By recording event reports to the event ledger, either the network operator or authorized client may monitor events that are occurring with regards to individual UE and/or sets of selected UE by accessing the records of an immutable ledger 174. Data obtained from the ledger 174 may be used to recreate and/or understand events affecting multiple trusted model non-3GPP UEs 110, and/or understand how trusted model non-3GPP UEs 110 are being used for purposes such as assigning network and/or device usage to specific clients, facilities, accounts, or based on other criteria.

Data stored to the event ledger(s) 174 may be used by various parties for various reasons. For example, a network operator may access the event ledger(s) 174 to associate network usage by one or more of the trusted model non-3GPP UEs 110 to a subscriber account. Similarly, an owner/operator or support vendor associated with a set of trusted model non-3GPP UEs 110 may access the event ledger(s) 174 to assess quality of service or other metric regarding a service that the devices are providing (e.g., to an end user).

Event data stored to the event ledger(s) 174 may be read and/or displayed by a dashboard services function 175. In some embodiments, the dashboard services function 175 may be implemented at least in part as a network function 128 of the operator core network 106 and/or at least in part as an application function 172 exposed by the NEF 150. In some embodiments, the dashboard services function 175 may at least in part be implemented as services executed on an edge server 164 of the core network edge 105. For example, the dashboard services function 175 may at least in part be integrated with the event aggregator 165. The dashboard services function 175 may include one or more APIs that may be called to query the event ledger(s) 174 and read event data from the event ledger(s) 174. The dashboard services function 175 may return one or more reports of selected event data in response to query requests. In some embodiments, such reports may present event data (which may include, for example, statistics and/or trending data) that can be presented using graphics (e.g., graph and/or charts) on the display of a UE. In general, dashboard services function 175 and/or other applications may be used by the owner and/or operator of one or more trusted model non-3GPP UEs 110 to perform one or more analytics on the event data recorded to the event ledger 174.

Figure 3:
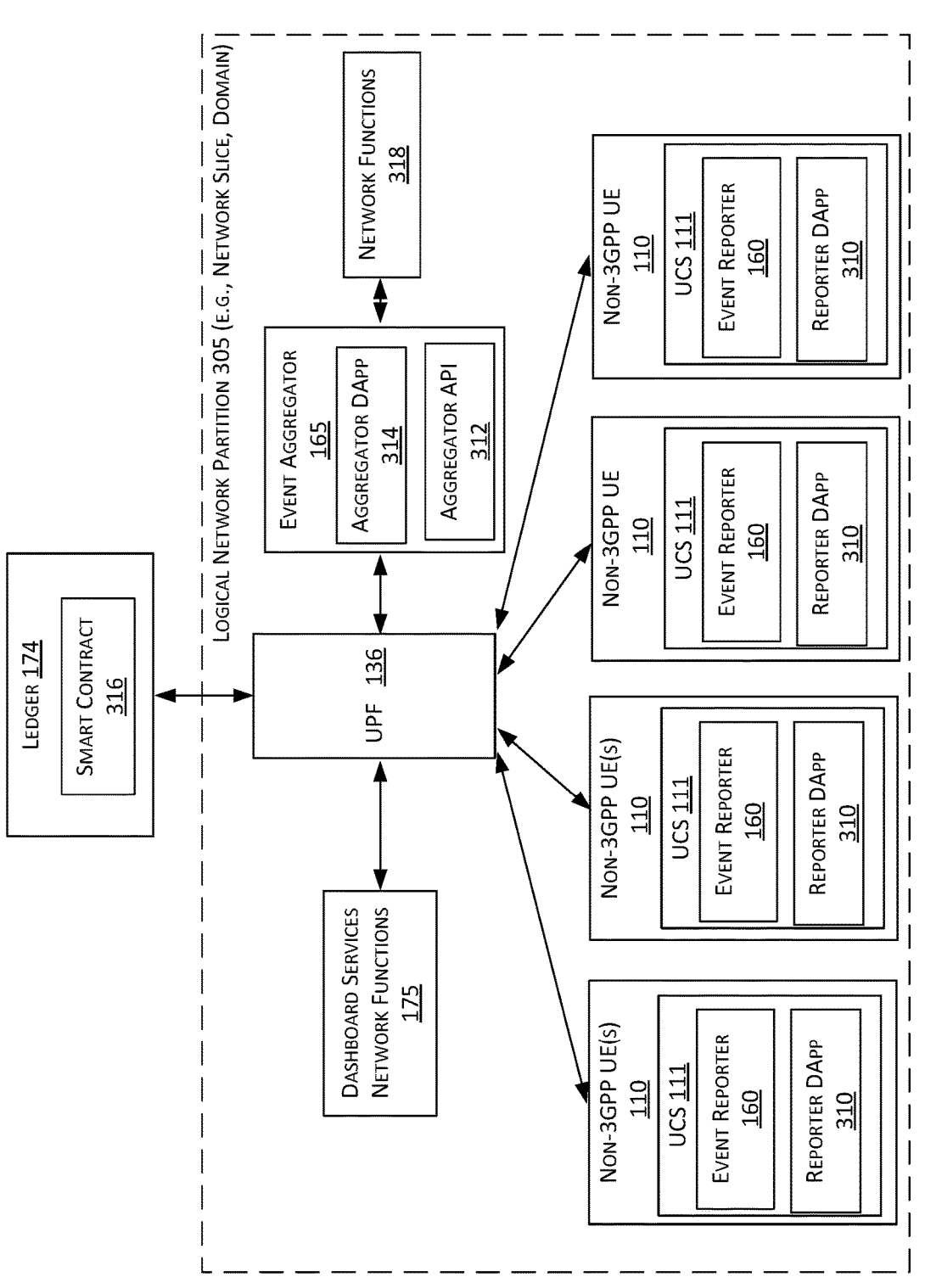
FIG. 3 is a diagram illustrating ledger-based telecommunications network event archiving, in accordance with some embodiments described herein.

Referring now to FIG. 3, FIG. 3 is a data flow diagram illustrating recording of event data from one or more trusted model non-3GPP UEs 110 to the event ledger 174. Note that in FIG. 3 one of more intermediate components between the illustrated components may be excluded from this diagram for simplification. In some embodiments, each UCS 111 may comprise a reporter DApp 310 (which may be at least in part integrated with the event reporter 160) to record records to the event ledger 174. The event reporter 160 may execute the reporter DApp 310 to execute a function or otherwise interact with a smart contract 316 recorded in the event ledger 174 to record new records (e.g., blocks) to the event ledger 174 based on the event data collected by the event reporter 160. As discussed above, the event reporter 160 may apply one or more labels to event reports, and such labels, in some embodiments, may be recorded with the event data to form a component of the record stored to the event ledger 174.

In some embodiments, the event reporter 160 of individual trusted model non-3GPP UEs 110 may transmit collected event data to the event aggregator 165. For example, the event aggregator 165 may comprise an aggregator API 312. By accessing the aggregator API 312, an event reporter 160 may transmit the event data it collected for its respective UE 110. Based on the event data received from multiple trusted model non-3GPP UEs 110 (and in some embodiments, also from 3GPP UEs 112), the event aggregator 165 may generate an aggregated event report for recordation to the event ledger 174. In one or more embodiments, the event aggregator 165 may further include data from one or more network functions 318 (e.g., which may include one or more of the network functions provided by the operator core network 106 and/or provided by a node (e.g., edger servicer 164) of the core network edge 105). For example, the event aggregator 165 may receive, and include in an event report, information describing usage of the one or more network functions 318 by one or more of the trusted model non-3GPP UEs 110.

In some embodiments, the event aggregator 165 may execute an aggregator DApp 314 to record event reports to the event ledger 174. For example, the event aggregator 165 may execute aggregator DApp 314 to execute a function or otherwise interact with the smart contract 316 recorded in the event ledger 174 to record new blocks to the event ledger 174 comprising event reports produced by the event aggregator 165. As discussed above, the event aggregator 165 may label event reports based on labels provided by the individual event reporters 160. In other embodiments, the event aggregator 165 may augment, replace, or omit event labels provided by the individual event reporters 160.

In some embodiments, the event aggregator 165 may aggregate event data received from a set of trusted model non-3GPP UEs 110 into an aggregated event record based at least in part on a relationship between the individual trusted model non-3GPP UE 110 of the set. For example, in some embodiments the operator core network 106 generates a logical network partition 305 (e.g., a network slice and/or network domain) that includes the set of trusted model non-3GPP UEs 110. A logical network partition 305, such as a network slice and/or network domain, may be implemented as a telecommunications network configuration that establishes multiple independent virtualized networks on the common physical infrastructure of the operator core network 106. As an example, a network slice may be established for a customer as a service that essentially provides the customer with a private end-to-end networking solution that includes complete logical isolation from other slices operating on the same physical infrastructure elements of the operator core network 106. In some implementations, for each logical network partition 305, network function instances can be orchestrated as needed to support the specific needs and/or use case of the customer. Moreover, network resources allocated to a logical network partition 305 may be tailored to customize parameters such as bandwidth, speed, and latency.

As such, with respect to logical network partition 305 illustrated in FIG. 3, the individual trusted model non-3GPP UE 110 may be associated within the context of the logical network partition 305 based on criteria such as, but not limited to, a common functionality, a common physical location, a common ownership, a shared set of common interactions with each other, and/or with other resources accessed through the operator core network 106. For example, in some embodiments, the set of trusted model non-3GPP UEs 110 may all be associated with network-operated devices (e.g., IoT devices) associated with an enterprise facility (e.g., a building and/or campus). In some embodiments, the set of trusted model non-3GPP UEs 110 may all be devices from a common manufacturer and/or may all share a common functionality (e.g., thermostats or other equipment controllers). Accordingly, in some embodiments, the event aggregator 165 may aggregate event data generated within the context of a particular logical network partition 305 so that the event reports recorded to the event ledger 174 by the event aggregator 165 may reflect the same relationship as shared by devices within the logical network partition 305. For example, where the logical network partition 305 is associated with a set of trusted model non-3GPP UEs 110 that each interact with a common set of one or more servers 156, then the event reports recorded to the event ledger 174 may primarily represent interactions between those UEs 110 and the one or more servers 156. In some embodiments, the ledger 174 may comprise a repository for event data comprising multiple individual ledgers dedicated to storing event reports associated with specific logical network partitions. In some embodiments, event reports recorded to the event ledger 174 may include a label indicating an identity of the logical network partition 305 to which the event reports apply. In some embodiments, dashboard services function 175 may be configured to access event data from the event ledger(s) 174 that corresponds to a specified logical network partition 305. For example, the dashboard services function 175 may be configured to read data from the event ledger(s) 174 labeled as being associated with the specified logical network partition 305. For example, using the dashboard services function 175, an owner or operator of the set of trusted model non-3GPP UEs 110 with logical network partition 305 may monitor the current and/or historical operation of their devices and/or what functions of the operator core network 106 are being applied in conjunction with the operation of their devices.

Figure 4A:
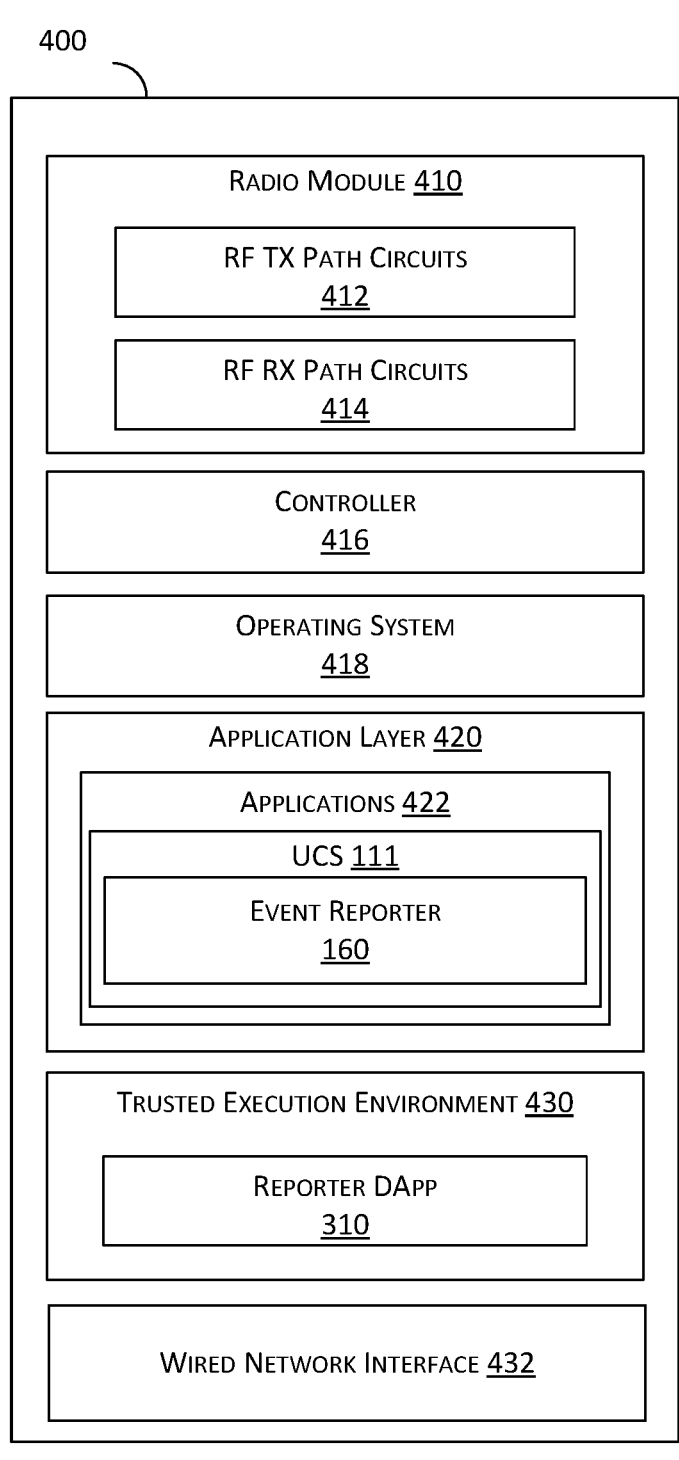
FIGS. 4A and 4B are diagrams illustrating an example trusted model non-3GPP UE, in accordance with some embodiments described herein.

With reference now to FIG. 4A, FIG. 4A illustrates an example UE 400 (such as trusted model non-3GPP UE 110) that executes one or more elements of a universal connectivity stack 111, including an event reporter 160 as discussed herein. Although some UEs may include different or other components, generally UE 400 includes at least one radio module 410 that includes one or more RF transmit (TX) path 412 circuits, one or more RF receive (RX) path 414 circuits, and a controller 416. Configuration of the RF TX path 412 and/or RF RX path 414 may be controlled by the radio module 410, for example, based on commands from the operating system 418 or other applications executed on the controller 416. In some embodiments, one or both of the TX path 412 and/or RF RX path 414 may comprise a plurality of RF paths, each corresponding to different frequency bands. In some embodiments, the UE 400 may authenticate with the operator core network 106 via the N3IWF 138 and access the telecommunications network wirelessly through an access network 104 (for example, using the radio module 410) or via a wired network interface 432. In some embodiments, the UE 400 in FIG. 4A may authenticate with the operator core network 106 and access the telecommunications network through the non-3GPP access network 104 (for example, using the radio module 410) using 3GPP authentication and security protocols to functionally extend an N3 user plane tunnel from the N3IWF 138 to the UCS 111 within the non-3GPP device.

In the embodiment shown in FIG. 4A, the UE 400 includes operating system 418 and one or more executable applications 422 that are executed by the controller 416 to implement the one or more functions of the trusted model non-3GPP UE 110 described herein, including the UCS 111 and event reporter 160. Generally a UE 400 includes at least application layer 420 and may include a trusted execution environment (TEE) 430. The application layer 420 facilitates execution of the UE 400 operating system 418 and executables (including applications 422). In some embodiments, one or more functions of the UCS 111 may be integrated into the operating system 418. In other words, the application layer 420 provides the direct user interaction environment for the UE 400. TEE 430 facilitates a secure area of the processor(s) of UE 400. That is, TEE 430 provides an environment in the UE 400 where isolated execution and confidentiality features are enforced. Example TEEs that may be used for UE 400 include, but are not limited to, Arm TrustZone technology, Software Guard Extensions (SGX) technology, Reduced Instruction Set Computer-Five (RISC-V), or similar technologies. In some embodiments, one or more functions of the UCS 111 may be integrated into one or more trustlets executed within the TEE 430.

In some embodiments, application layer 420 may include applications executed in a rich environment and/or applications executed in the TEE 430. For example, the application layer 420 may comprise the UCS 111 and/or event reporter 160 and/or other application(s) for interacting with the event aggregator 165 and/or event ledger(s) 174. One or more functions of the UCS 111 and/or event reporter 160 may be executed in the rich environment, and/or at least partially executed in the TEE 430. Generally, computer-readable code executed in the TEE 430 is referred to as a "trustlet." One or more functions of the UCS 111 and/or event reporter 160 may be implemented at least in part as a "trustlet" in the trusted environment (e.g., UCS trustlet(s) 444 and/or event reporter trustlet(s) 446) and protected from tampering or manipulation by a hardware Root of Trust and hosted from the TEE 430. A trustlet can securely access data-stored memory of the UE 400 that is otherwise inaccessible in the application layer 420. A trustlet may take the form of trusted processes, secure processes, isolated user mode (IUM) processes, or the like. For example, a trustlet executed in TEE 430 can access system-level data (that is, data related to the larger machine the UE 400 is incorporated within), private and/or public keys, and similar data stored, or accessed, by the UE 400. Trustlets can be activated in response to various network or UE operations. For example, a trustlet can be activated by execution of an associated application in the application layer 420. In some embodiments, a trustlet for event reporter 160 may be activated based on an interaction with one or more network functions of the operator core network 106 and/or interactions with event aggregator 165. For another example, a trustlet can be activated in response to a command generated by a network (e.g., operator core network 106 of FIG. 1) and communicated to the UE 400.

Figure 4B:
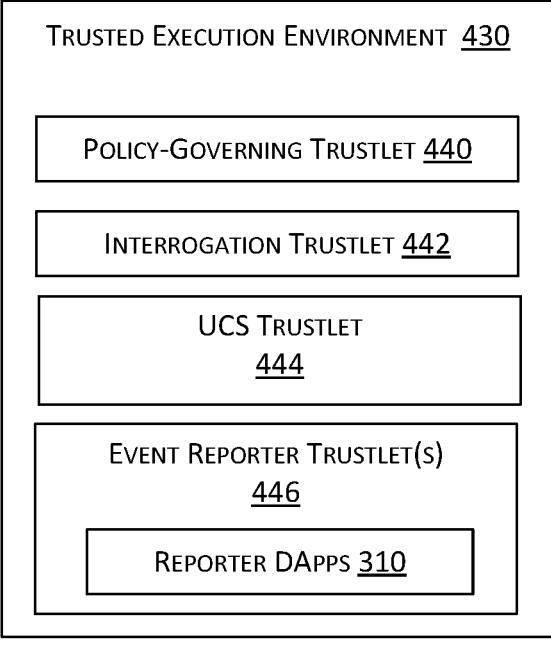

Referring now to FIG. 4B, FIG. 4B illustrates a TEE 430. As depicted, TEE 430 illustratively may include a policy-governing trustlet 440, an interrogation trustlet 442, a UCS trustlet 444, and at least one event reporter trustlet 446 that may include the reporter DApp(s) 310. In other embodiments, a TEE 430 may include a fewer or greater number of trustlets.

Policy-governing trustlet 440 corresponds to an illustrative example of computer-readable code that is activated in response to execution of an application or operation. Upon activation, policy-governing trustlet 440 may access a locally stored set of keys corresponding to the application and the UE's and/or network device's processor. Such keys may be utilized by the UCS 111 for establishing the secured communication link (e.g., extended user plane tunnel(s) 120) between the trusted model non-3GPP 110 and the N3IWF 138 and/or UPF 136. Additionally, policy-governing trustlet 440 may access the trusted model non-3GPP 110's unique device identifier (e.g., quasi-SIM device ID or DID). In some embodiments, the quasi-SIM device ID may be based on decentralized identifiers (DIDs) and/or on a self-sovereign identity (SSI) paradigm, such as World Wide Web Consortium (W3C) DIDs, for example, as described herein. The quasi-SIM device ID may be stored in the TEE 430 and transmitted to the operator core network 106 as part of the process to authenticate the trusted model non-3GPP 110 using 3GPP authorization protocols. In some embodiments, the quasi-SIM device ID may comprise a DID that resolves to a DID document. The DID document may be stored at a data registry (e.g., a verifiable data registry). For example, a DID may include a Universal Resource Identifier (URI) that associates a trusted model non-3GPP 110 (as a DID subject) with a DID document. The DID may include, for example, cryptographic public keys that the trusted model non-3GPP 110 may use to authenticate itself with the operator core network 106 and prove its association with the DID (e.g., the device ID). In some embodiments, the device ID may be based on a self-sovereign identity (SSI) paradigm where the trusted model non-3GPP 110 may present its quasi-SIM device ID to the operator core network 106, which may verify that the device ID was issued from a trusted issuer. In some embodiments, a quasi-SIM device ID may comprise a combination of identifiers, such as any of those described herein. The quasi-SIM device ID may comprise a combination of hardware identifiers, network address identifiers, serial numbers, component identifiers (e.g., CPU IDs), and/or other identifiers such as those discussed herein. In some embodiments, a quasi-SIM device ID may be managed (using a DApp, crypto wallet, or the like, for example) and verified using public-key cryptography in conjunction with a distributed ledger. For example, in some embodiments the quasi-SIM device ID for a trusted model non-3GPP 110 may be generated by a backend blockchain ledger and downloaded to the trusted model non-3GPP 110.

Interrogation trustlet 442 corresponds to an illustrative example of computer-readable code that is activated in response to a command from the communication network. An interrogation trustlet can be activated by a command that is generated in response to a determination that trusted model non-3GPP 110 is an unknown device or that the UE provided anomalous data for a requested network service. In response to activation, an interrogation trustlet 442 may activate other trustlets, access additional data, or perform any other trustlet operation. The interrogation trustlet 442 may communicate the accessed data to a network function of the operator core network 106. For example, interrogation trustlet 442 can be activated in response to a command that a network function 128 or server application from a server on data network 107 has requested data from one or more trustlets executed in the trusted execution environment 430.

In some embodiments, an event reporter trustlet 446 may be activated by the interrogation trustlet 442 in response to a request for access to the event ledger 174 to record event data. Other trusted applets may also be executed to perform one or more secure operations with the event ledger 174 and/or event aggregator 165 either instead of, or in conjunction with, the reporter DApp(s) 310.

Referring now to FIG. 5, FIG. 5 at 504 illustrates an example event record for storing event data as a record in event ledger 174. In one or more embodiments, event record 504 may represent a constituent ledger record (e.g., a ledger block) of the event ledger 174. That is, event record 504 may define a ledger record of a block structured as a blockchain block for inclusion in a block-chain structure of the event ledger 174.

The event record 504 may comprise a ledger reference ID 510 that correlates the event records document by that block to the event ledger 174. As mentioned herein, the event ledger 174 may comprise, for example, an element of a distributed ledger network (DLN) and/or distributed ledger technology (DLT)-based records repository. In some embodiments, the event ledger 174 comprises a hyperledger and/or blockchain technology. Each event record 504 may further comprise a UE device ID 512 (e.g., the quasi-SIM device ID for the trusted model non-3GPP UE 110 associated with the event data), one or more smart contracts 512, event labels 515 applied to the event data (e.g., by the event reporter 160 and/or event aggregator 165), and event data 516 reported by the event reporter 160. The event data 516 may be associated with a single network event recorded by the event reporter 160, or a set of multiple events recorded by the event reporter 160. In some embodiments, the event ledger 174 may comprise a plurality of linked ledgers that reference each other so that a particular set of event records 504 may be located by the combination of the event ledger reference ID 510 and the UE device ID 514. In some embodiments, the event ledger 174 may comprise a framework having one or more sidechains corresponding to different sets of event records 504 to increase scalability. In some embodiments, a ledger record 504 may include record cryptograph data 518. The record cryptograph data 518 may include a combination of a hash address and a previous hash address. The hash address may be generated by applying a hashing algorithm to one or more of the contents of the event record(s) 504 that may be included in the ledger block of the event ledger 174. The previous hash address may comprise the hash address of the preceding event record block 504 in the event ledger 174, thus providing a reference hash address to link subsequent blocks and/or records of the event ledger 174 to prior blocks and/or records. In some embodiments, access to the event data 516 (e.g., either read access or read-write access) may be controlled by the smart contract(s) 514. As discussed herein, the event reporter 160 and/or the event aggregator 165 may execute a DApp to activate the smart contract(s) 514 and/or authenticate itself to the smart contract(s) 514. In some embodiments, the smart contract(s) 514 may include one or more functions that the event reporter 160 and/or the event aggregator may activate to generate one or more new event records 504 for the purpose of creating a new event record. Those new event records may then be added to the event ledger 174 by adding one or more new blocks 504 to the blockchain of the event ledger 174. In some embodiments, the smart contract(s) 514 will execute one or more algorithms to permit the dashboard services function 175 to access (read) event data 516 to query the event ledger 174 to retrieve sets of event data 516 specified by the query. FIG. 5 at 506 illustrates an example aggregated event record for storing event data as a record in event ledger 174. As illustrated by FIG. 5, the aggregated event record 506 may include an aggregation of event data from multiple trusted model non-3GPP UEs 110 compiled by the event aggregator 165 into a single event record for recording to the event ledger 174. In some embodiments, event data 516 may comprise information that references or is otherwise used by a cloud-based service and/or network function to render one or more services for a trusted model non-3GPP UE 110 and/or account for trusted model non-3GPP UE 110 use of network resources.

FIG. 6 is a flow chart illustrating a method 600 for ledger-based network event archiving, according to some embodiments. It should be understood that the features and elements described herein with respect to the method of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa. In some embodiments, elements of method 600 are implemented utilizing one or more processing units, such as the controller of an operator core network, an edge server, a RAN, a UE, network function, application server, and/or other processing units as disclosed in any of the embodiments herein. In some embodiments, the method 600 may be implemented by components of a telecommunications network environment 100, such as is illustrated by FIG. 1.

In some embodiments, method 600 comprises a method for ledger-based network event archiving that may be executed with respect to a network (e.g., a telecommunications network comprising a network operating core, as described herein) that establishes connectivity of a trusted model non-3GPP UE using a universal connectivity stack that uses 3GPP authorization protocols to authenticate the non-3GPP UE with the operator core network, and generates a secure extended user plane tunnel to an operator network core user plan function (UPF). In some embodiments, to function as a trusted model device, a non-3GPP device is configured with a 3GPP compatible universal connectivity stack (UCS). The UCS may comprise software for creating a secure tunnel (e.g., an IPsec tunnel) using 3GPP authentication and security protocols to functionally extend an N3 user plane tunnel from an N3IWF of the core network to the UCS within the non-3GPP device. This UCS extended user plane tunnel functionally extends the core network N3 user plane interface through the N3IWF to the interface with the non-3GPP device (e.g., to an interface with the UCS), which opens access for the non-3GPP device to Application Programming Interfaces (APIs) and services of the telecommunications network/operator core network otherwise accessible to SIM-based 3GPP devices that connect through a radio access network (RAN), such as a cellular base station. In some embodiments, the method includes storing event data associated with the trusted model non-3GPP UE 110 as immutable data records in an event ledger. Because event reports are created by a UCS of a trusted model non-3GPP UE authenticated by 3GPP protocols, and transported through a secured and trusted transport path, the data stored to the event ledger may be given a high degree of trust as accurately representing network activities of that trusted model non-3GPP UE.

The method 600 at B610 includes creating an extended user plane tunnel from a user equipment (UE) through a non-3GPP access network to a user plane function (UPF) of an operator core network for a telecommunications network, the extended user plane tunnel established based at least on a 3GPP-based authentication protocol performed by the UE with the operator core network. The 3GPP-based authentication protocol may comprise Authentication and Key Management (AKA) protocol such as, but not limited to, 5G-Authentication and Key Management (5G-AKA), Extensible Authentication Protocol-Authentication and Key Management (EAP-AKA'), and/or Extensible Authentication Protocol-Transport Layer Security (EAP-TLS). In some embodiments, the method includes executing a universal connectivity stack in the UE to performing the 3GPP-based authentication protocol with the operator core network. The UE may connect to the non-3GPP access network via a non-3GPP network technology (e.g., WiFi or Bluetooth) before performing the 3GPP-based authentication protocol with the operator core network. The extended user plane tunnel may be created in response to a successful 3GPP-based authentication between the UE and the operator core network. In some embodiments, the UE is identified to the operator core network using a quasi-SIM device ID such as a decentralized identifier (DID) and/or a self-sovereign identity (SSI)-based framework. For example, a DID may be used to identify the UE within the SSI-based framework where the UE can leverage a DID to create their self-sovereign digital identity.

The method 600 at B612 includes collecting a set of event data representing network events corresponding to use of the one or more services of the operator core network by the UE. The universal connectivity stack may include an event reporter to collect the set of event data. In some embodiments, the event reporter collects events based on a reporting policy. In some embodiments, an event reporter may collect event data for recording to the event ledger, for example, by observing interactions between the UCS and the operator network core, and/or by monitoring data traffic between the trusted model non-3GPP UE and the operator network core.

The method 600 at B614 includes communicating the set of event data via the extended user plane tunnel for recordation in an event ledger. The event ledger may comprise at least one of a blockchain ledger technology or a hyperledger technology, and/or comprise an element of a distributed ledger network (DLN) and/or distributed ledger technology (DLT)-based records repository. In some embodiments, the method may execute a decentralized application (DApp) to interact with at least one smart contract of the event ledger. Functions of the smart contract may then be accessed to record the set of event data to the event ledger as an event record. In some embodiments, the UE may communicate the set of event data via the extended user plane tunnel to an event aggregator executed by at least one network node of the telecommunications network. The event aggregator may then record the set of data to the event ledger as a ledger record. In some embodiments, the event aggregator may execute a decentralized application (DApp) to interact with at least one smart contract of the event ledger. Functions of the smart contract may then be accessed by the event aggregator to record an aggregated event record comprising sets of event data received from a plurality of UEs. The method may include applying one or more labels to the set of event data and/or event records based on a type of event represented by the event data. The labels may be recorded with the event data in an event record.

Figure 7:
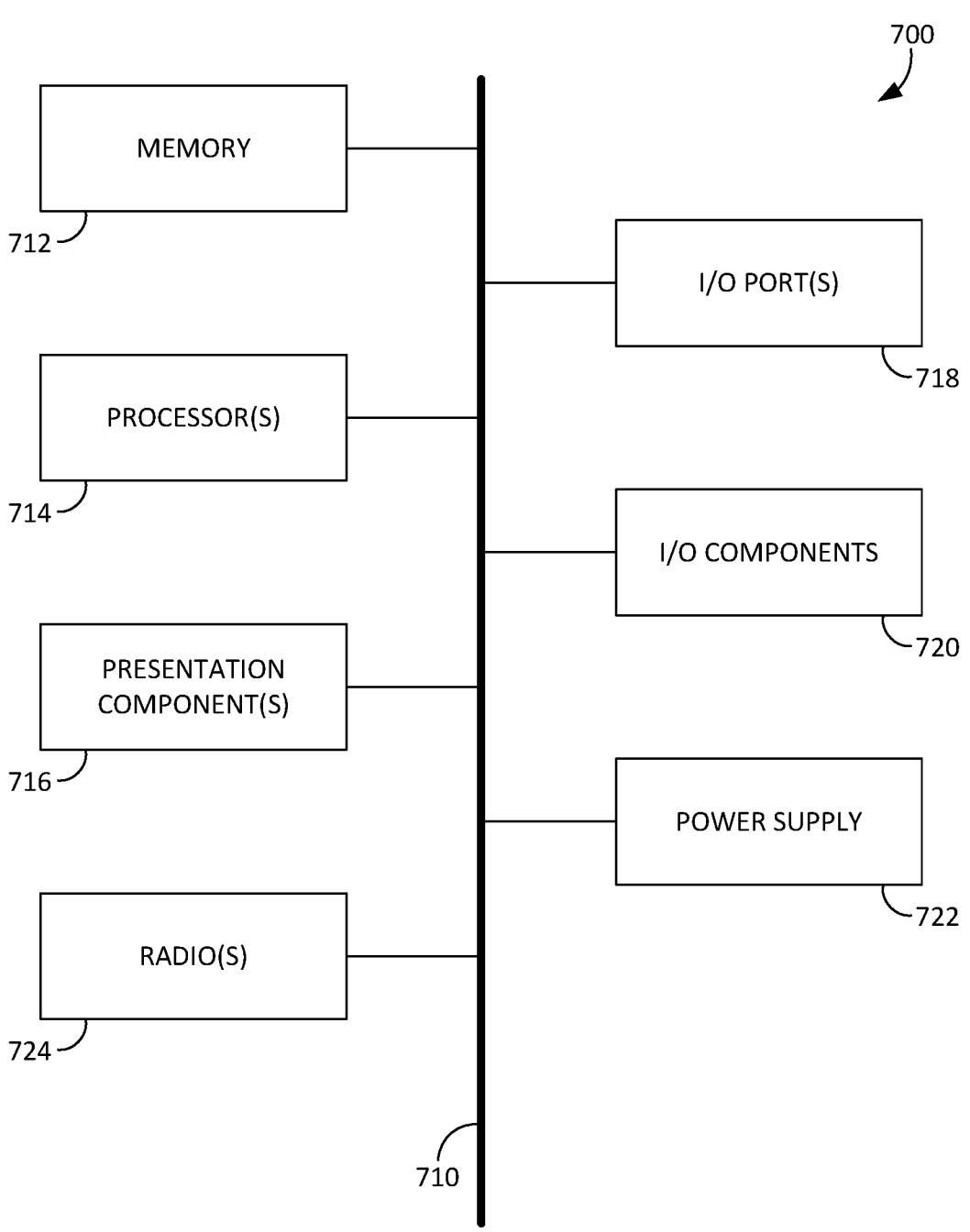
FIG. 7 is an example computing device, in accordance with some embodiments described herein.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein, and nor should computing device 700 be interpreted as having any dependency or requirement relating to any one or combination of components illustrated.

The implementations of the present disclosure may be described in the general context of computer code or machine-useable instructions, including computer-executable instructions, such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory 712, one or more processors 714, one or more presentation components 716, input/output (I/O) ports 718, I/O components 720, power supply 722, and radio 724. Bus 710 represents what may be one or more buses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, one or more functions of a UCS 111, event reporter 160, event aggregator 165 and/or event ledger 174 may be executed at least in part by a computing device such as computing device 700. The processors of computing device 700, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or non-volatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. One or more presentation components 716 present data indications to a person or other device. Exemplary one or more presentation components 716 include a display device, speaker, printing component, vibrating component, etc. I/O ports 718 allow computing device 700 to be logically coupled to other devices, including I/O components 720, some of which may be built into computing device 700. Illustrative I/O components 720 include a microphone, joystick, game pad, satellite dish, scanner, printer, wireless device, etc.

Radio(s) 724 represents a radio that facilitates communication with a wireless telecommunications network. For example, radio(s) 724 may be used to establish communications with components of the access network 104, RAN 102, operator core network 106, and/or core network edge 105. Illustrative wireless telecommunications technologies include CDMA, GPRS, TDMA, GSM, and the like. Radio(s) 724 may additionally or alternatively facilitate other types of wireless communications including Wi-Fi, WiMAX, LTE, and/or other communications technology. As an example, the RF transmit path circuit 412 and RF receiver path circuits 414 of radio module 410 may be implemented using radio(s) 724. In some embodiments, radio(s) 724 may support multimodal connections that include a combination of 3GPP radio technologies (e.g., 4G, 5G, and/or 6G) and/or non-3GPP radio technologies. As can be appreciated, in various embodiments, radio(s) 724 can be configured to support multiple technologies (e.g., multiple radio access technologies (RATs) and/or multiple radios can be utilized to support multiple technologies. In some embodiments, the radio(s) 724 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Referring to FIG. 8, a diagram is depicted generally at 800 of an exemplary cloud computing environment 810 for implementing one or more aspects of ledger-based network event archiving, implemented by the systems and methods described herein. Cloud computing environment 810 is but one example of a suitable cloud computing environment and is not intended to suggest any limitation as to the scope of use or functionality of the embodiments presented herein, and nor should cloud computing environment 810 be interpreted as having any dependency or requirement relating to any one or combination of components illustrated. In some embodiments, the cloud computing environment 810 is coupled to a network 805 (e.g., operator core network 106, the core network edge 105, and/or a DN 107) and/or may be executed at least in part within operator core network 106, the core network edge 105, or otherwise coupled to the core network edge 105 or operator core network 106. As previously mentioned, in some embodiments, one or more functions described herein pertaining to the UCS 111, event reporter 160, event aggregator 165, and/or event ledger 174 may be executed on cloud computing environment 810.

Cloud computing environment 810 includes one or more controllers 820 comprising one or more processors and memory. The controllers 820 may comprise servers of a data center. In some embodiments, the controllers 820 are programmed to execute code to implement at least one or more aspects of the event aggregator 165 and/or event ledger 174. For example, in one embodiment event reporter 160, event aggregator 165, event ledger 174, dashboard services function 175, and/or any of the network functions or application functions discussed herein may be implemented as one or more virtual network functions (VNFs) (which may include one or more container network functions (CNFs)) 830 running on a worker node cluster 825 established by the controllers 820.

The cluster of worker nodes 825 may include one or more orchestrated Kubernetes (K8s) pods that realize one or more containerized applications 835. In other embodiments, another orchestration system may be used. For example, the worker nodes 825 may use lightweight Kubernetes (K3s) pods, Docker Swarm instances, and/or other orchestration tools. In some embodiments, one or more elements of the network environment 100 may be implemented by, or coupled to, the controllers 820 of the cloud computing environment 810 by operator core network 106 and/or core network edge 105. In some embodiments, event ledger(s) 174 may be implemented at least in part as one or more data store persistent volumes 840 in the cloud computing environment 810.

In various alternative embodiments, system and/or device elements, method steps, or example implementations described throughout this disclosure (such as the UE, access networks, core network edge, operator core network, network functions, application functions, one or more functions of a UCS, event reporter, event aggregator and/or event ledger, and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other embodiments of the present disclosure may include elements comprising program instructions resident on computer-readable media that when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of device having a physical, tangible form. Program instructions include, but are not limited to, computer-executable instructions executed by computer system processors and hardware description languages such as Verilog or Very High Speed Integrated Circuit (VHSIC) Hardware Description Language (VHDL).

As used herein, the terms "function," "unit," "server," "node," "gateway," and "module" are used to describe computer processing components and/or one or more computer-executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized, and that structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for ledger-based telecommunications network event archiving, the system comprising:

one or more processors; and one or more computer-readable media storing computer-usable instructions that, when executed by the one or more processors, cause the one or more processors to:

create an extended user plane tunnel from a universal connectivity stack (UCS) of a user equipment (UE) through a non-3GPP access network to a user plane function (UPF) of an operator core network for a telecommunications network, the extended user plane tunnel functionally extending a user plane interface of the operator core network to the UCS within the UE, the extended user plane tunnel established based at least on a 3GPP-based authentication protocol performed by the UE with the operator core network;

collect a set of event data representing network events corresponding to use of one or more services of the operator core network by the UE; and communicate the set of event data via the extended user plane tunnel for recordation in an event ledger.

2. The system of claim 1, wherein the 3GPP-based authentication protocol comprises at least one of 5G-Authentication and Key Management (5G-AKA), Extensible Authentication Protocol-Authentication and Key Management (EAP-AKA'), or Extensible Authentication Protocol-Transport Layer Security (EAP-TLS).

3. The system of claim 1, wherein the event ledger comprises at least one of a blockchain ledger technology or a hyperledger technology.

4. The system of claim 1, the one or more processors further to:

execute a decentralized application (DApp) to interact with at least one smart contract of the event ledger; and use the at least one smart contract to record the set of event data to the event ledger as an event record.

5. The system of claim 1, the one or more processors further to:

apply one or more labels to the set of event data based on a type of event represented by the set of event data; and communicate the one or more labels with the set of event data for recordation in the event ledger.

6. The system of claim 1, the one or more processors further to:

communicate the set of event data via the extended user plane tunnel to an event aggregator executed by at least one network node of the telecommunications network, wherein the event aggregator records the set of event data to the event ledger as a ledger record.

7. The system of claim 1, the one or more processors further to:

execute the universal connectivity stack in the UE to perform the 3GPP-based authentication protocol with the operator core network; and wherein the universal connectivity stack includes an event reporter to collect the set of event data.

8. The system of claim 1, the one or more processors further to:

connect the UE to the non-3GPP access network via a non-3GPP network technology before performance of the 3GPP-based authentication protocol by the UE.

9. The system of claim 1, wherein the extended user plane tunnel is created in response to a successful 3GPP-based authentication between the UE and the operator core network.

10. The system of claim 1, the one or more processors further to:

identify the UE to the operator core network using a device ID that comprises at least one of:

a decentralized identifier (DID); and a self-sovereign identity (SSI)-based identifier.

11. A system for ledger-based telecommunications network event archiving, the system comprising:

one or more processors; and one or more computer-readable media storing computer-usable instructions that, when executed by the one or more processors, cause the one or more processors to:

create a plurality of extended user plane tunnels from a universal connectivity stack (UCS) within individual user equipment (UE) of a plurality of UE through one or more non-3GPP access networks to a user plane function (UPF) of an operator core network for a telecommunications network, the plurality of extended user plane tunnels functionally extending a user plane interface of the operator core network to the UCS within the individual UE, the plurality of extended user plane tunnels established based at least on a 3GPP-based authentication protocol performed by respective individual UE of the plurality of UE with the operator core network;

receive, via the plurality of extended user plane tunnels, a set of event data from the respective individual UE representing network events corresponding to use of one or more services of the operator core network by the respective individual UE; and communicate the set of event data from the respective individual UE to an event ledger for recording as event records.

12. The system of claim 11, the one or more processors further to:

compile the set of event data from the respective individual UE into an aggregated event record and communicate the aggregated event record to the event ledger for recording.

13. The system of claim 12, the one or more processors further to:

execute a decentralized application (DApp) to interact with at least one smart contract of the event ledger; and using the at least one smart contract, record the aggregated event record to the event ledger.

14. The system of claim 12, the one or more processors further to:

apply one or more labels to the aggregated event record based on a type of event represented by the set of event data.

15. The system of claim 11, wherein the event ledger comprises at least one of a blockchain ledger technology or a hyperledger technology.

16. The system of claim 11, wherein the 3GPP-based authentication protocol comprises at least one of 5G-Authentication and Key Management (5G-AKA), Extensible Authentication Protocol-Authentication and Key Management (EAP-AKA'), or Extensible Authentication Protocol-Transport Layer Security (EAP-TLS).

17. A method for ledger-based telecommunications network event archiving, the method comprising:

authenticating a user equipment (UE) with an operator core network of a telecommunications network using a 3GPP-based authentication protocol, wherein the UE is connected to the operator core network by a non-3GPP access network;

in response to successfully authenticating the UE with the operator core network, generating an extended user plane tunnel from a universal connectivity stack (UCS) of the UE through the non-3GPP access network to a user plane function (UPF) of the operator core network, the extended user plane tunnel functionally extending a user plane interface of the operator core network to the UCS within the UE;

collecting a set of event data representing network events corresponding to use of one or more services of the operator core network by the UE; and reporting the set of event data via the extended user plane tunnel for recordation in an event ledger.

18. The method of claim 17, the method further comprising:

executing a decentralized application (DApp) to interact with at least one smart contract of the event ledger; and using the at least one smart contract, record the set of event data to the event ledger as an event record.

19. The method of claim 17, the method further comprising:

communicating the set of event data via the extended user plane tunnel to an event aggregator executed by at least one network node of the telecommunications network; and wherein the event aggregator records the set of event data to the event ledger as a ledger record.

20. The method of claim 17, wherein the event ledger comprises at least one of a blockchain ledger technology or a hyperledger technology.

* * * * *